United States Patent
Hepperla et al.

(10) Patent No.: US 10,067,482 B2
(45) Date of Patent: Sep. 4, 2018

(54) MENU AND FIRMWARE MANAGEMENT FOR EQUIPMENT

(71) Applicant: Emerson Climate Technologies Retail Solutions, Inc., Kennesaw, GA (US)

(72) Inventors: Paul L. Hepperla, Chaska, MN (US); Gary Olson, Belle Plaine, MN (US); John Wallace, Acworth, GA (US)

(73) Assignee: Emerson Climate Technologies Retail Solutions, Inc., Kennesaw, GA (US)

( * ) Notice: Subject to any disclaimer, the term of this patent is extended or adjusted under 35 U.S.C. 154(b) by 483 days.

(21) Appl. No.: 14/712,473

(22) Filed: May 14, 2015

(65) Prior Publication Data
US 2015/0331395 A1 Nov. 19, 2015

Related U.S. Application Data

(60) Provisional application No. 61/994,162, filed on May 16, 2014.

(51) Int. Cl.
*G05B 11/01* (2006.01)
*G05B 15/02* (2006.01)
(Continued)

(52) U.S. Cl.
CPC .............. *G05B 11/01* (2013.01); *A47J 36/00* (2013.01); *G05B 15/02* (2013.01); *G06F 3/0482* (2013.01);
(Continued)

(58) Field of Classification Search
CPC ......... G05B 11/01; G05B 15/02; H04L 41/00; H04L 12/12; G06Q 50/12; G06F 3/0482; A47J 36/00; Y02B 60/34
See application file for complete search history.

(56) References Cited

U.S. PATENT DOCUMENTS 6,826,267 B2 * 11/2004 Daum ................ H04L 12/2803
   340/12.53
8,412,387 B2 * 4/2013 Park ...................... G06Q 50/06
   307/118
(Continued)

FOREIGN PATENT DOCUMENTS

WO  WO-2012174595 A1  12/2012

OTHER PUBLICATIONS

International Search Report regarding International Application No. PCT/US2015/031154, dated Sep. 2, 2015.
(Continued)

*Primary Examiner* — Charles Kasenge
(74) *Attorney, Agent, or Firm* — Harness, Dickey & Pierce, P.L.C.

(57) ABSTRACT

A system and method are provided and include an equipment controller for operating a piece of kitchen equipment. The equipment controller has a memory storing an initial menu of food items each having associated operating parameters for operating the kitchen equipment when preparing the associated food item. The system also includes a supervisory controller in communication with the equipment controller and in communication with a remote monitor that receives an updated menu for the kitchen equipment from a remote terminal. The updated menu includes at least one of a food item modification and an operating parameter modification. The supervisory controller receives the updated menu from the remote monitor and communicates the updated menu to the equipment controller for installation by the equipment controller.

39 Claims, 23 Drawing Sheets

(51) Int. Cl.
*G06F 3/0482* (2013.01)
*A47J 36/00* (2006.01)
*G06Q 50/12* (2012.01)
*H04L 12/12* (2006.01)
*H04L 12/24* (2006.01)

(52) U.S. Cl.
CPC ............. *G06Q 50/12* (2013.01); *H04L 12/12* (2013.01); *H04L 41/00* (2013.01); *Y02B 60/34* (2013.01); *Y02D 50/40* (2018.01)

(56) References Cited

U.S. PATENT DOCUMENTS

| | | | | |
|---|---|---|---|---|
| 9,225,766 | B2* | 12/2015 | Philip | H04L 67/025 |
| 9,385,784 | B2* | 7/2016 | Kim | H04L 12/282 |
| 9,467,853 | B2* | 10/2016 | Shim | H04L 12/2803 |
| 9,572,361 | B2* | 2/2017 | Bordin | G09B 19/24 |
| 2002/0059175 | A1 | 5/2002 | Nakano | |
| 2002/0143623 | A1 | 10/2002 | Dayley | |
| 2003/0080116 | A1 | 5/2003 | Williamson | |
| 2003/0109938 | A1* | 6/2003 | Daum | H04L 12/2803 |
| | | | | 700/11 |
| 2003/0121912 | A1* | 7/2003 | Kyung-Hwan | H05B 6/688 |
| | | | | 219/702 |
| 2003/0141295 | A1* | 7/2003 | Ishikawa | H05B 6/688 |
| | | | | 219/697 |
| 2009/0167506 | A1 | 7/2009 | Wong | |
| 2009/0258331 | A1 | 10/2009 | Do et al. | |
| 2010/0161431 | A1 | 6/2010 | Koether et al. | |
| 2011/0196547 | A1* | 8/2011 | Park | G06Q 50/06 |
| | | | | 700/296 |
| 2012/0296486 | A1* | 11/2012 | Marriam | G05B 15/02 |
| | | | | 700/296 |
| 2012/0303140 | A1* | 11/2012 | Cox | G05B 15/02 |
| | | | | 700/17 |
| 2013/0030552 | A1* | 1/2013 | Beckley | G05B 19/0423 |
| | | | | 700/17 |
| 2013/0052616 | A1* | 2/2013 | Silverstein | G09B 19/00 |
| | | | | 434/127 |
| 2013/0214935 | A1* | 8/2013 | Kim | G08C 17/02 |
| | | | | 340/870.02 |
| 2013/0325939 | A1* | 12/2013 | Shim | G06Q 50/10 |
| | | | | 709/203 |
| 2014/0087660 | A1* | 3/2014 | Kim | H04L 12/282 |
| | | | | 455/41.1 |
| 2014/0170275 | A1* | 6/2014 | Bordin | G09B 19/24 |
| | | | | 426/233 |
| 2014/0180847 | A1* | 6/2014 | Silverstein | G09B 19/00 |
| | | | | 705/15 |
| 2014/0272817 | A1* | 9/2014 | Park | G09B 5/02 |
| | | | | 434/127 |
| 2015/0111539 | A1* | 4/2015 | Shim | H04L 12/2803 |
| | | | | 455/411 |

OTHER PUBLICATIONS

Written Opinion of the International Searching Authority regarding International Application No. PCT/US2015/031154, dated Sep. 2, 2015.

Search Report regarding European Patent Application No. 15793111.4, dated Aug. 28, 2017.

* cited by examiner

MENU AND FIRMWARE MANAGEMENT FOR EQUIPMENT

CROSS-REFERENCE TO RELATED APPLICATIONS

This application claims the benefit of U.S. Provisional Application No. 61/994,162, filed on May 16, 2014. The entire disclosure of the above application is incorporated herein by reference.

FIELD

The present disclosure relates to systems and methods for menu and firmware management for equipment and, more specifically, to systems and methods for menu and firmware management for kitchen equipment.

BACKGROUND

This section provides background information related to the present disclosure which is not necessarily prior art.

Food services facilities often include multiple pieces of commercial kitchen equipment. For example, restaurants, supermarkets, school or dormitory cafeterias, and other facilities that provide food services often include multiple pieces of commercial kitchen equipment used for food preparation. Such kitchen equipment, for example, may include ovens, fryers, stoves, grills, griddles, microwaves, fume hoods, slicers, blenders, drink or shake makers, food processors, mixers, and other equipment used to prepare food.

The kitchen equipment may store a menu of food items that can be prepared with the kitchen equipment. The kitchen equipment may optionally include a user interface for displaying a menu of food items and for receiving input and selections used to operate the kitchen equipment during food preparation. For example, a commercial oven may include a menu with a number of available food items that can be prepared using the oven. For example, the food services facility may be a sandwich restaurant and the oven may include a user interface that displays multiple different sandwiches that can be heated in the oven. The menu may include operating parameters, such as, for example, a cook time and a cook temperature, used by the kitchen equipment for preparing associated food items. By selecting a particular food item for preparation, the kitchen equipment can automatically operate according to the appropriate associated operating parameters. For example, by selecting a particular sandwich for preparation, the oven can automatically be operated with the appropriate cook time and temperature for the selected sandwich. As another example, a fryer may store a menu that includes different food items that can be prepared using the fryer, such as French fries or chicken strips, along with associated cook times and temperatures for the different food items. The fryer may optionally include a user interface displaying the different food items that can be selected for preparation with the fryer, such as French fries or chicken strips. For example, the user interface may display the food items with text, icons, graphics, or other visual cues. When a particular food item is then selected for preparation, the fryer is operated according to the appropriate corresponding cook time and temperature stored in the menu for the selected food item.

Periodically, as the food services facilities change their menus, the menus for the kitchen equipment may need to be updated. For example, the food items and/or the associated operating parameters for the food items may need to be updated. For kitchen equipment operated with an associated user interface display, the user interface display may also need to be updated. Additionally, periodically the firmware for the kitchen equipment may likewise need to be updated. Traditionally, to perform a menu or firmware update for the kitchen equipment, the updated menu or firmware would be copied to a memory device, such as a USB drive, that would then be used to copy the updated menu or firmware to the kitchen equipment. For example, a user may physically insert the USB drive with files for the updated menu or firmware into a USB interface on the kitchen equipment to copy the updated menu or firmware to the kitchen equipment. Upon the next startup cycle, the kitchen equipment would then install the updated menu or firmware to complete the update.

The use of individual memory devices, such as USB drives, to facilitate menu or firmware updates for kitchen equipment can be costly and logistically difficult, especially for food services companies that have many sites, such as individual restaurants, spread over a large geographic area.

SUMMARY

This section provides a general summary of the disclosure, and is not a comprehensive disclosure of its full scope or all of its features.

In various embodiments of the present disclosure, a system is provided that includes an equipment controller for operating a piece of kitchen equipment. The equipment controller has a memory storing an initial menu with a plurality of food items, each food item having at least one associated operating parameter for operating the piece of kitchen equipment when preparing the associated food item. The system also includes a supervisory controller in communication with the equipment controller and in communication with a remote monitor that receives an updated menu for the piece of kitchen equipment from a remote terminal. The updated menu includes at least one of a food item modification to the plurality of food items and an operating parameter modification to at least one of the associated operating parameters for the plurality of food items. The supervisory controller receives the updated menu from the remote monitor and communicates the updated menu to the equipment controller for installation by the equipment controller.

In various embodiments of the present disclosure, a method is provided and includes storing, with an equipment controller for operating a piece of kitchen equipment, an initial menu in a memory of the equipment controller, the initial menu having a plurality of food items each food item having at least one associated operating parameter for operating the piece of kitchen equipment when preparing the associated food item. The method also includes receiving, with a remote monitor, an updated menu for the piece of kitchen equipment from a remote terminal, the updated menu including at least one of a food item modification to the plurality of food items and an operating parameter modification to at least one of the associated operating parameters for the plurality of food items. The method also includes receiving, with a supervisory controller in communication with the equipment controller and the remote monitor, the updated menu from the remote monitor. The method also includes communicating, with the supervisory controller, the updated menu to the equipment controller for installation by the equipment controller.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure includes systems and methods for connecting kitchen equipment to a supervisory controller at a facility or site. The supervisory controller, for example, may be part of, and/or in communication with, a building automation system (BAS) at the facility or site. In this way, the kitchen equipment can communicate with the supervisory controller, which, in turn, can communicate with a remote monitor located remotely from the facility or site. In this way, a user at a remote terminal can log in to the remote monitor and initiate a menu or firmware update for particular kitchen equipment. The menu or firmware update can then be communicated from the remote monitor to the supervisory controller at the facility or site and then to the particular piece of kitchen equipment. Moreover, for food services companies that utilize similar kitchen equipment at multiple facilities or sites, a user at a remote terminal can initiate a menu or firmware update that can be pushed out and propagated to supervisory controllers at multiple facilities or sites for installation by all applicable pieces of kitchen equipment. In this way, a user or operator can perform a single update action for a menu or firmware update at the remote monitor that is then propagated to all associated supervisory controllers and applicable kitchen equipment for some or all of the company's facilities or sites. In addition, as described in further detail below, utilization of the BAS to communicate with kitchen equipment allows for the remote monitor to receive and monitor operational, usage, and energy data for the kitchen equipment, which can then be used for diagnostics and predictive maintenance, as well as for generation of reports and recommendations with respect to energy usage and equipment configuration and repairs.

Figure 1A:
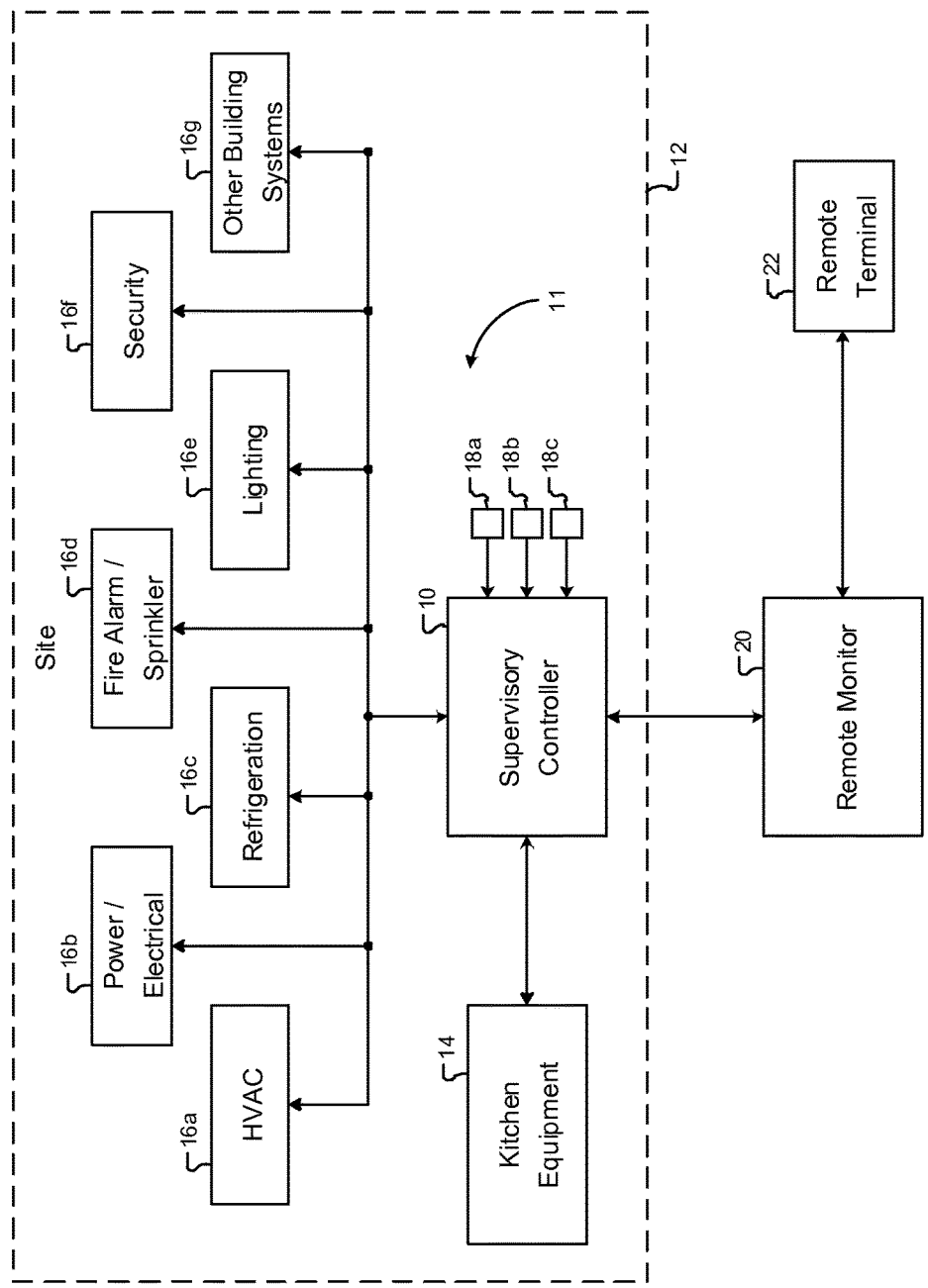
FIG. 1A is a block diagram of an example menu and firmware management system for equipment.

With reference to FIG. 1A, a supervisory controller 10 of a BAS 11 is shown at a particular site 12. The supervisory controller 10 is in communication with kitchen equipment 14. Communication between the supervisory controller 10 and the kitchen equipment 14 may be implemented through a wired connection, such as a wired RS-485 connection, or a wireless connection, such as a Wi-Fi or Bluetooth connection. Wireless connections may allow for the kitchen equipment 14 to be relocated or positioned without having to disconnect and reconnect the wired connections for the kitchen equipment 14. For example, the supervisory controller 10 and kitchen equipment 14 may each be connected to a local area network (LAN) at the site 12 that includes a wired and/or wireless network router, as appropriate.

The site 12, for example, may be a food services location, such as a restaurant, supermarket, school cafeteria, or dormitory cafeteria, with multiple pieces of commercial kitchen equipment 14 used for food preparation.

In addition to the kitchen equipment 14, the supervisory controller 10 may also be connected to various other building systems, such as an HVAC system 16a, a power/electrical system 16b, a refrigeration system 16c, a fire alarm/sprinkler system 16d, a lighting system 16e, a security system 16f, and any other applicable communicating building systems 16g at the site 12. The supervisory controller 10 may monitor and/or control the various building systems 16 through communication with corresponding controllers for each of the building systems 16. For example, the supervisory controller 10 may be an ecoSYS Site Supervisor available from Emerson Climate Technologies Retail Solutions, Inc., 1065 Big Shanty Road, NW, Suite 100, Kennesaw, Ga. 30144. Alternatively, the supervisory controller 10 may be, for example, an E2 Facility Management System controller also available from Emerson Climate Technologies Retail Solutions, Inc., or a similar facility or site supervisor controller, or other controller, with the operational and communication functionality as described.

In addition to communicating with the kitchen equipment 14 and the various building systems 16, the supervisory controller 10 may also monitor and receive environmental data generated by environmental sensors 18. For example, the environmental sensors 18 may include an indoor ambient temperature sensor 18a, an outdoor ambient temperature sensor 18b, and one or more other sensors 18c that sense environmental conditions. For example, the one or more other sensors 18c may include a humidity sensor, a pressure sensor, a dew point sensor, and/or a light level sensor. Alternatively, the supervisory controller 10 may monitor and receive environmental data, such as indoor and outdoor ambient temperature data, humidity data, pressure data, and dew point data, from the HVAC system 16a or the refrigeration system 16c. Further, the supervisory controller 10 may monitor and receive environmental data, such as light level data from the lighting system 16e.

The supervisory controller 10 is in communication with a remote monitor 20, which can be located at a central location remote from the site 12. For example, the remote monitor 20 may communicate with the supervisory controller 10 via a wide area network (WAN) such as the Internet or via cellular communication. Alternatively, the remote monitor 20 can be located at the site 12 and may communicate with the supervisory controller 10 via the site's LAN.

The remote monitor 20 receives and monitors data from the supervisory controller 10, including data related to the kitchen equipment 14 and each of the various building systems 16. In addition, as discussed in further detail below, the remote monitor 20 can communicate updates to the supervisory controller 10 for the kitchen equipment 14 and the various building systems 16. As discussed in further detail below, the remote monitor 20 can communicate menu and firmware updates to the supervisory controller 10 for communication to, and installation at, the kitchen equipment 14. For example, the remote monitor 20 may include a server or other computing device executing the ProAct Service Center software, used by Emerson Climate Technologies Retail Solutions, Inc., 1065 Big Shanty Road, NW, Suite 100, Kennesaw, Ga. 30144.

The remote monitor 20 is in communication with a remote terminal 22. The remote terminal 22 may be, for example, a computing device, such as a desktop, laptop, tablet, or mobile computing device, operated by a user. For example, the user may utilize the remote terminal 22 to login to the remote monitor 20 and review associated data collected from various sites 12 associated with the user. For example, the user may be an administrator for a food services company, such as a restaurant chain, and may login to the remote monitor 20 via the remote terminal 22 to review data collected from some or all of the sites associated with the food services company. As described in further detail below, the user may use the remote terminal 22 to generate updated menus or firmware for particular kitchen equipment and to communicate the updated menus or firmware to the remote monitor 20 for communication to the supervisory controller 10 for communication to and installation at the kitchen equipment 14.

The user may be located at a site 12 or may be located at a location remote from both the site 12 and the remote monitor 20. In such case, the remote terminal 22 may communicate with the remote monitor 20 via a WAN such as the Internet or via cellular communication. If the remote terminal 22 is at the same location as the remote monitor 20, the remote terminal 22 may communicate with the remote monitor 20 over a LAN accessible to both the remote monitor 20 and the remote terminal 22.

Figure 1B:
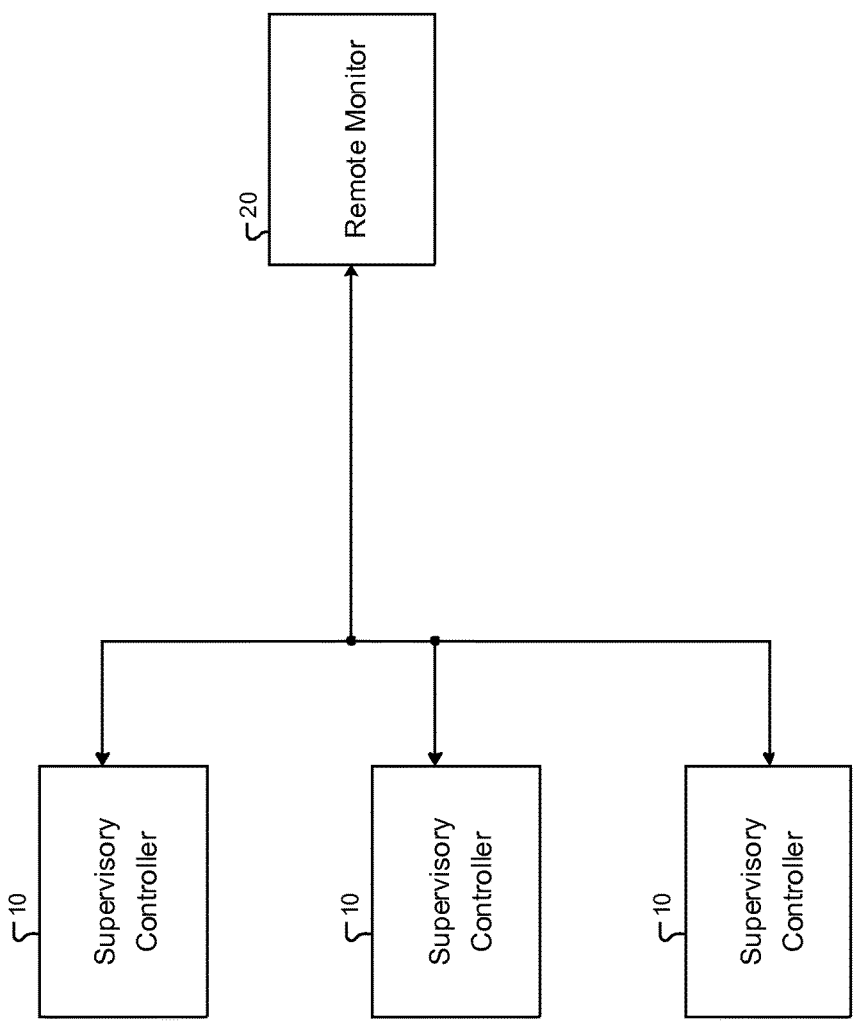
FIG. 1B is a block diagram of an example menu and firmware management system for equipment.

As shown in FIG. 1B, the remote monitor 20 may be in communication with multiple supervisory controllers 10 located at multiple sites 12. For example, a food services company, such as a restaurant chain, may have multiple restaurants located at multiples sites 12, each with an associated supervisory controller 10 in communication with the remote monitor 20.

Figure 2:
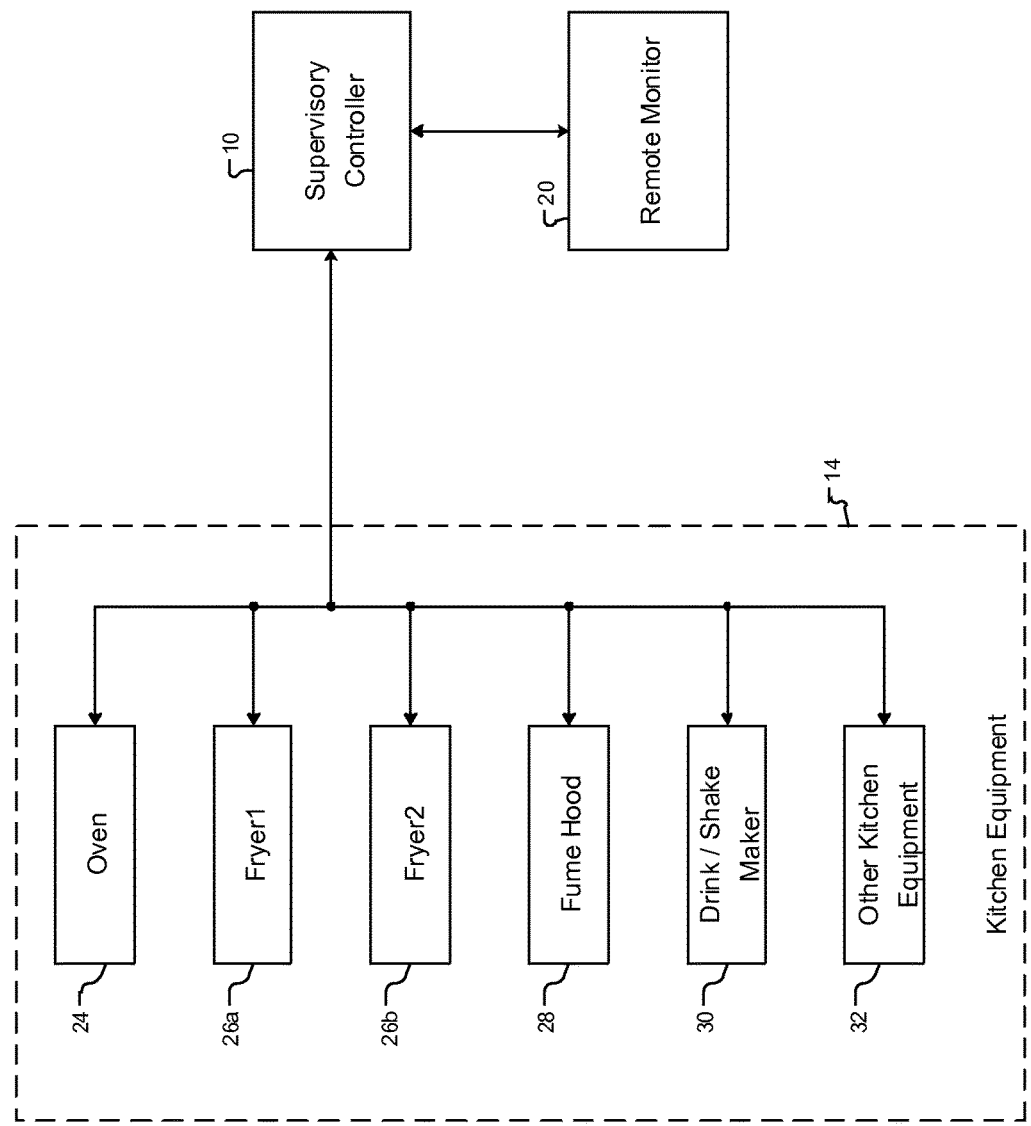
FIG. 2 is a block diagram of an example menu and firmware management system for equipment.

With reference to FIG. 2, the kitchen equipment 14 may include multiple individual pieces of kitchen equipment 14. For example, the kitchen equipment 14 at a particular site 12 may include an oven 24, a first fryer 26a, a second fryer 26b, a fume hood 28, a drink/shake maker 30, and any other kitchen equipment 32 utilized for food preparation, or otherwise, at the site 12. For example, other kitchen equipment 32 may also include stoves, grills, griddles, microwaves, slicers, blenders, food processors, mixers, etc. Further, while specific pieces of kitchen equipment 14 are shown in FIG. 2, any combination of kitchen equipment 14, utilizing additional or fewer pieces of individual items, can be used. As shown in FIG. 2, each of the individual pieces of kitchen equipment 14 is in communication with the supervisory controller 10. As discussed above, communication from the individual pieces of kitchen equipment 14 to the supervisory controller 10 may be accomplished via a wired or wireless connection, for example, over a LAN associated with the particular site 12.

Figure 3A:
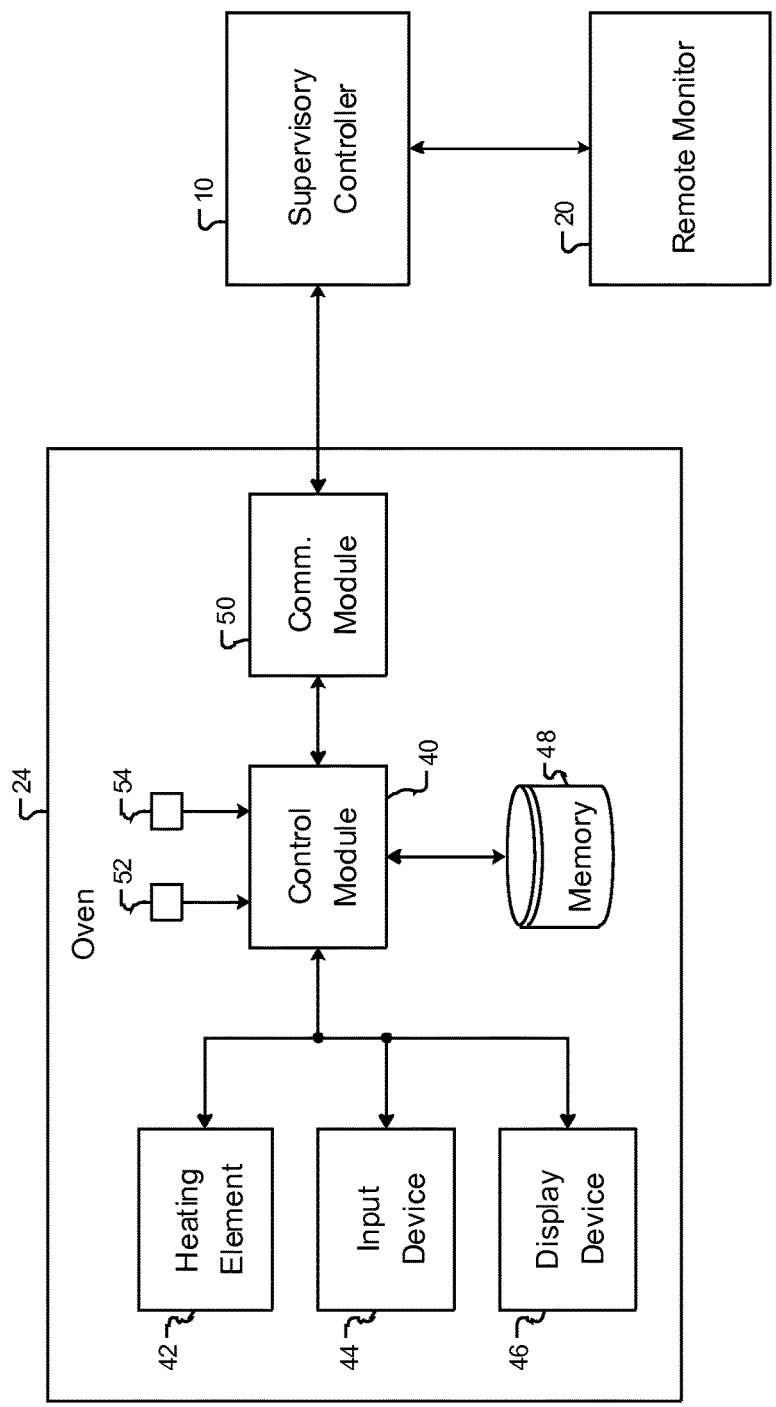
FIG. 3A is a block diagram of an example menu and firmware management system for equipment.

With reference to FIGS. 3A to 3E and 4A to 4B, further details are shown for a number of different embodiments, each including an individual piece of kitchen equipment 14, in this case the oven 24. In FIG. 3A to 3E, for example, the oven 24 includes an equipment controller or control module 40, a heating element 42, a memory 48, and a communication module 50. The control module 40 executes firmware stored in the memory 48 to operate the oven 24, as appropriate. The communication module 50 facilitates communication between the control module 40 of the oven 24 and, for example, the supervisory controller 10. Additionally, as shown in FIG. 3A, the oven 24 may optionally include an input device 44 and/or may optionally include a display device 46. For example, based on inputs received from the input device 44, the control module 40 may operate the heating element 42 of the oven. As discussed in further detail below with reference to FIGS. 3B to 3D, the input device 44 and/or the display device 46 may be omitted from the oven 24 and, instead, the oven 24 may be in communication with a user interface device 53, separate from the oven 24, that receives user input and communicates the user input to the oven 24.

With reference again to FIG. 3A, the input device 44 and the display device 46 may be a combination touchscreen device. Alternatively, the display device 46 may be a display screen and the input device 44 may include buttons positioned alongside the display device. Alternatively, the display device 46 may be an indicator, such as a light. The input device 44 and display device 46, whether separate or together as a combination touchscreen device, may provide a user interface whereby output is provided to a user and input is received from a user.

Figure 4A:
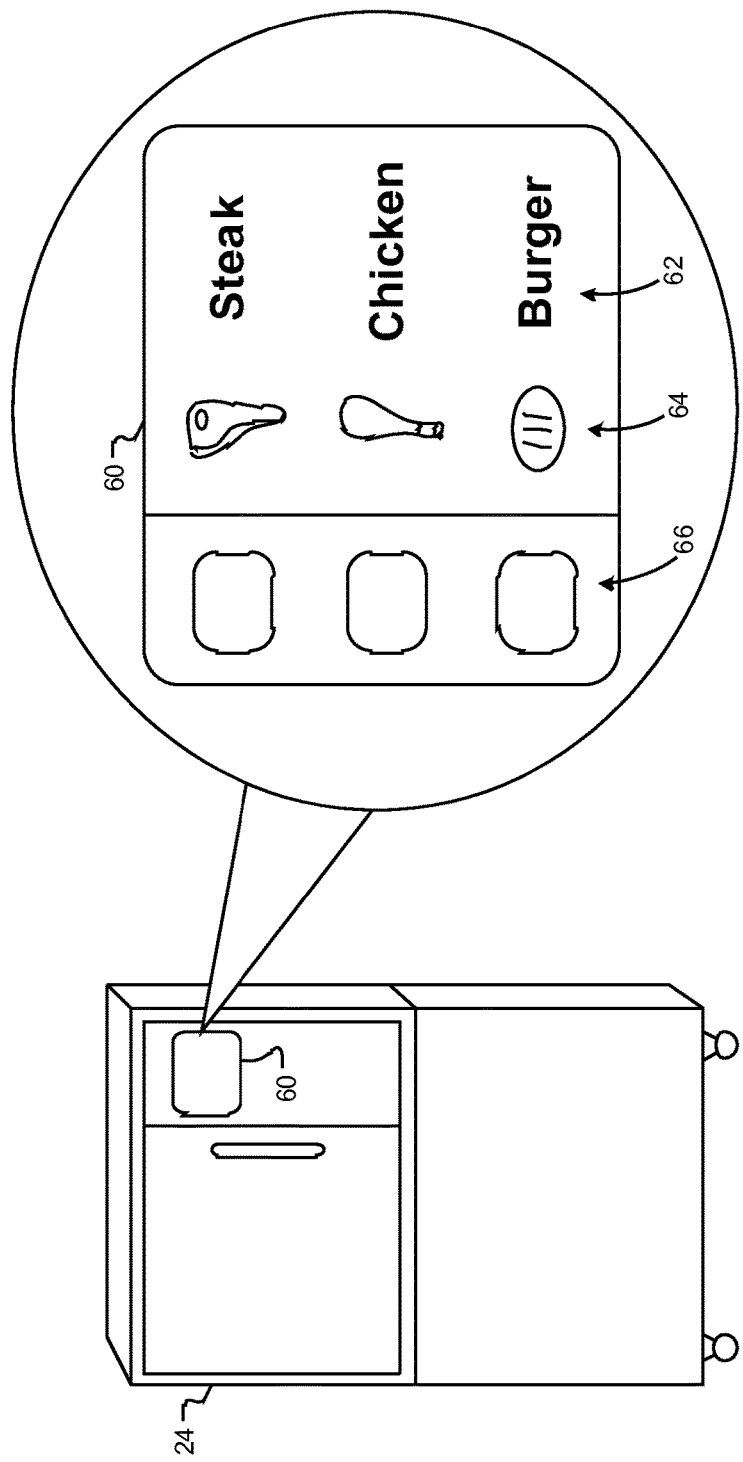
FIG. 4A is a perspective view of a piece of kitchen equipment and a user interface.

With reference to FIG. 4A, for example, the oven 24 is shown with a user interface 60. As shown, the user interface 60 may display three food items for possible selection. In this case, the user interface 60 includes a text description 62 for the individual food items, listed as "Steak," "Chicken," and "Burger." Additionally, the user interface 60 may include an associated graphic, visual cue, or icon 64 for each of the food items. For example, the associated icon 64 can include a graphical depiction of the associated food item. Additionally, the user interface 60 includes buttons 66 corresponding to each of the associated food items to allow a user to select an associated food item. If the user interface 60 is implemented with a combination touchscreen device, the buttons 66 may be virtual buttons displayed on the touchscreen. If a separate input device 44 and display device 46 are used, the buttons 66 may be physical buttons on the front of the oven 24 alongside the display portion displaying the text description 62 and icons 64 for the associated food items.

Figure 3B:
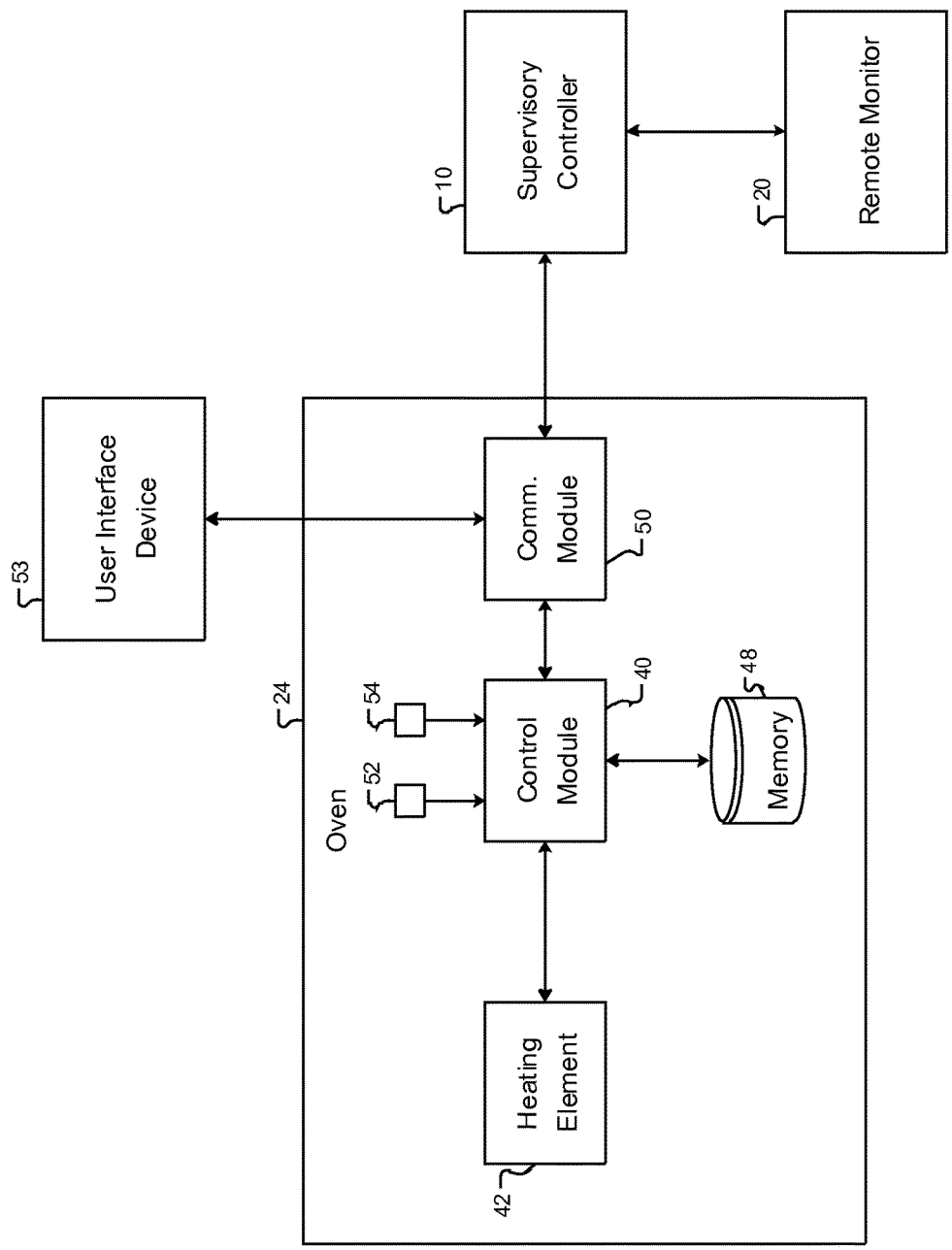
FIG. 3B is a block diagram of an example menu and firmware management system for equipment.
Figure 3C:
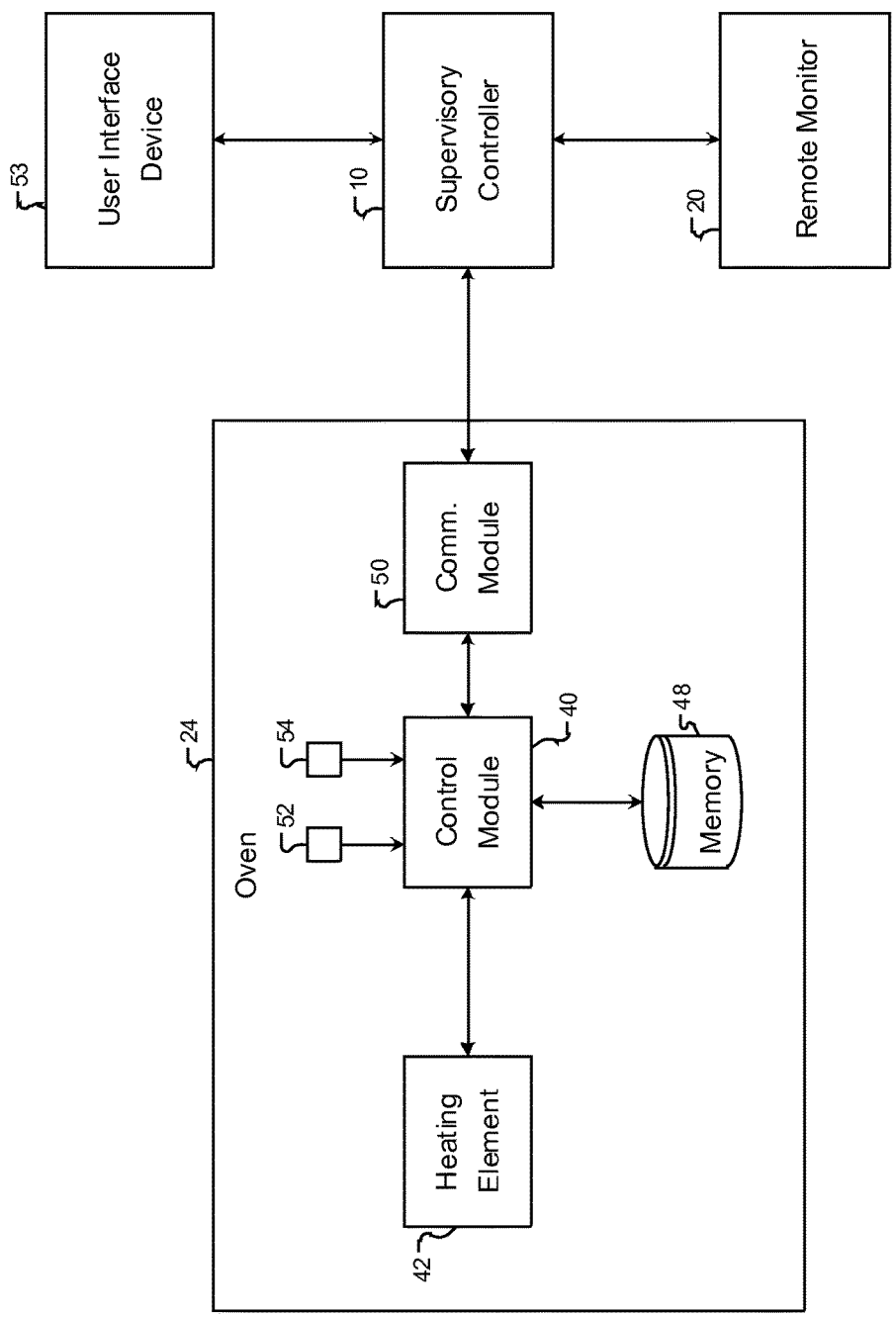
FIG. 3C is a block diagram of an example menu and firmware management system for equipment.
Figure 3D:
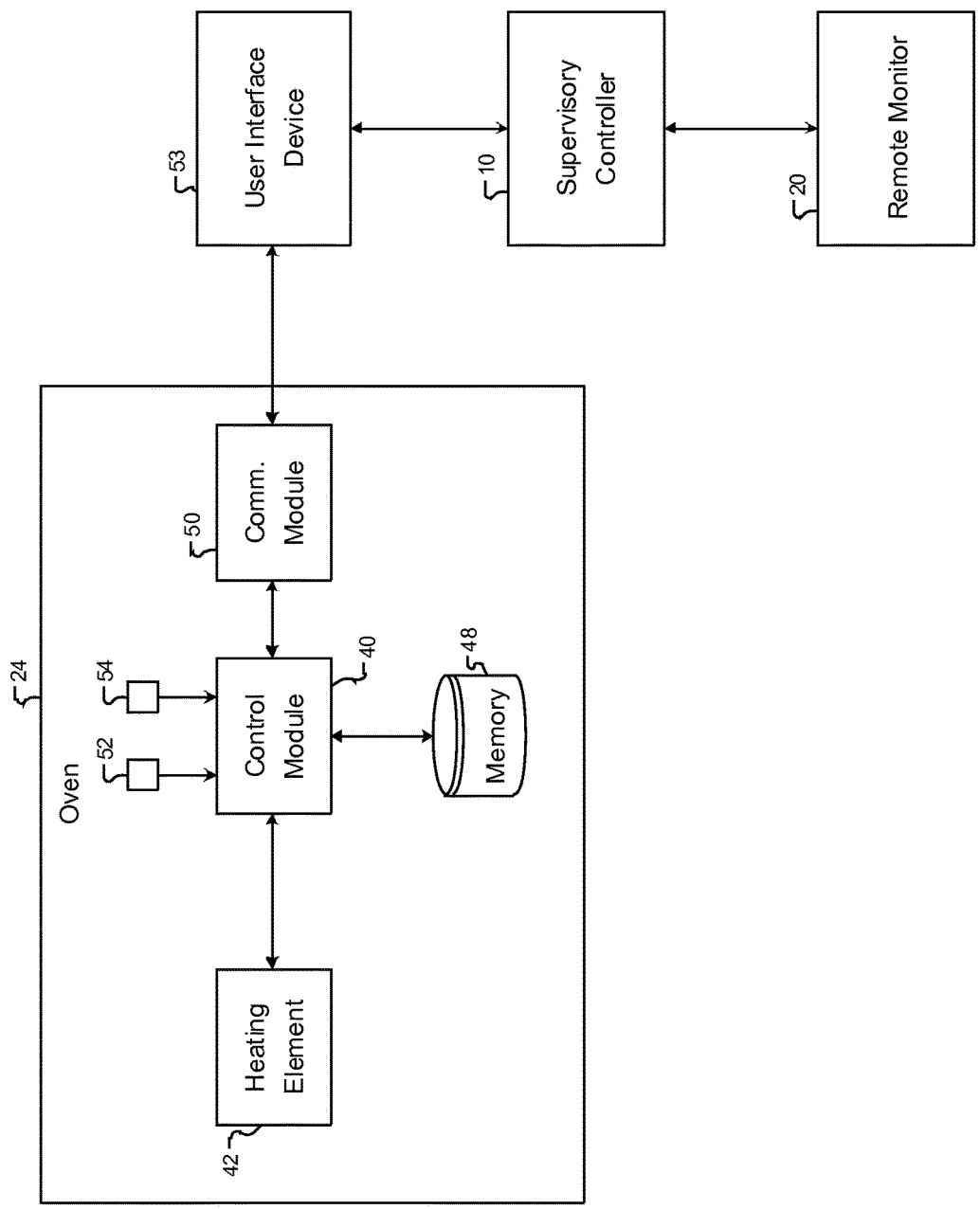
FIG. 3D is a block diagram of an example menu and firmware management system for equipment.
Figure 4B:
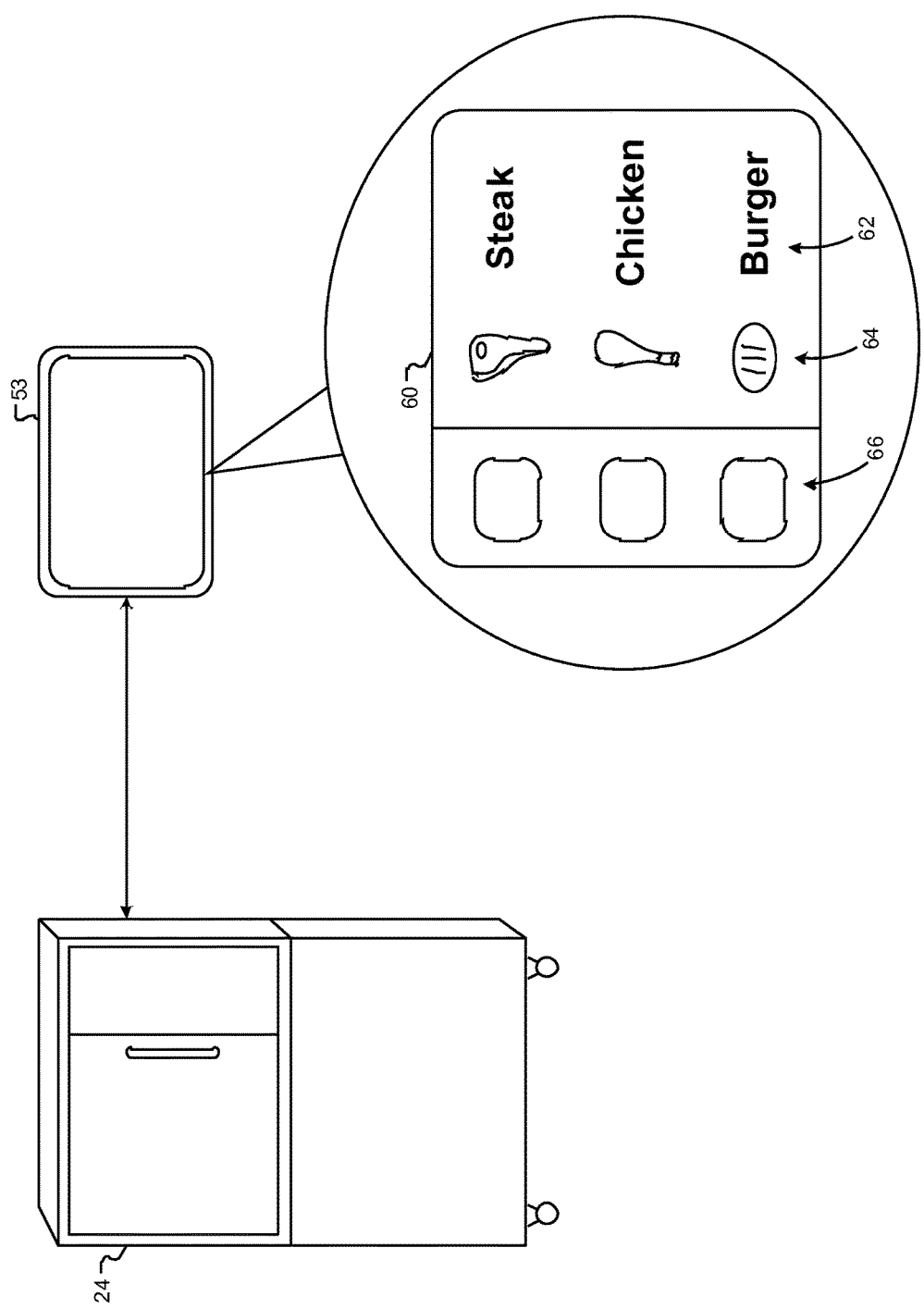
FIG. 4B is a perspective view of a piece of kitchen equipment and a user interface.

With reference to FIGS. 3B to 3D, as an alternative to having an input device 44 and/or display device 46 located at the oven 24, the oven may instead be in communication with a user interface device 53 separate from the oven. In these embodiments, for example, the kitchen equipment 14 itself, in this case the oven 24, does not include an input device 44 and/or display device 46, but instead communicates with the separate user interface device 53. For example, the user interface device 53 may include a computing device, such as a desktop computing device, a laptop computing device, a tablet computing device, or a mobile computing device that receives input from a user and/or displays output to a user. With reference to FIG. 4B, the user interface device 53 is shown, for example, as a tablet computing device and displays the same user interface 60 as discussed above with respect to FIG. 4A. The user interface device 53 may be, for example, located in the kitchen associated with the oven 24 and may be mounted on a wall or countertop of the kitchen. Alternatively, the user interface device 53 may be located in a separate room from the kitchen.

With reference again to FIGS. 3B to 3D, the user interface device 53 may be configured for communication with the communication module 50 of the kitchen equipment 14, in this case the oven 24. For example, as shown in FIG. 3B, the user interface device 53 communicates directly with the communication module 50 of the oven 24. As further shown in FIG. 3B, the communication module 50 may also communicate with the supervisory controller 10. With reference to FIG. 3C, the user interface device 53 may communicate with the communication module 50 of the oven 24 through the supervisory controller 10. In this way, the user interface device 53 may receive user input and communicate the user input to the supervisory controller 10 for communication to the oven 24. The oven 24 may, likewise, communicate output to the supervisory controller 10, which is then communicated to the user interface device 53 for display to the user. With reference to FIG. 3D, the user interface device 53 may serve as a communication bridge between the oven 24 and the supervisory controller 10. In this way the user interface device 53 may communicate directly with each of the oven 24 and the supervisory controller 10, while the oven 24 and the supervisory controller 10 communicate with each other through the user interface device 53.

Figure 3E:
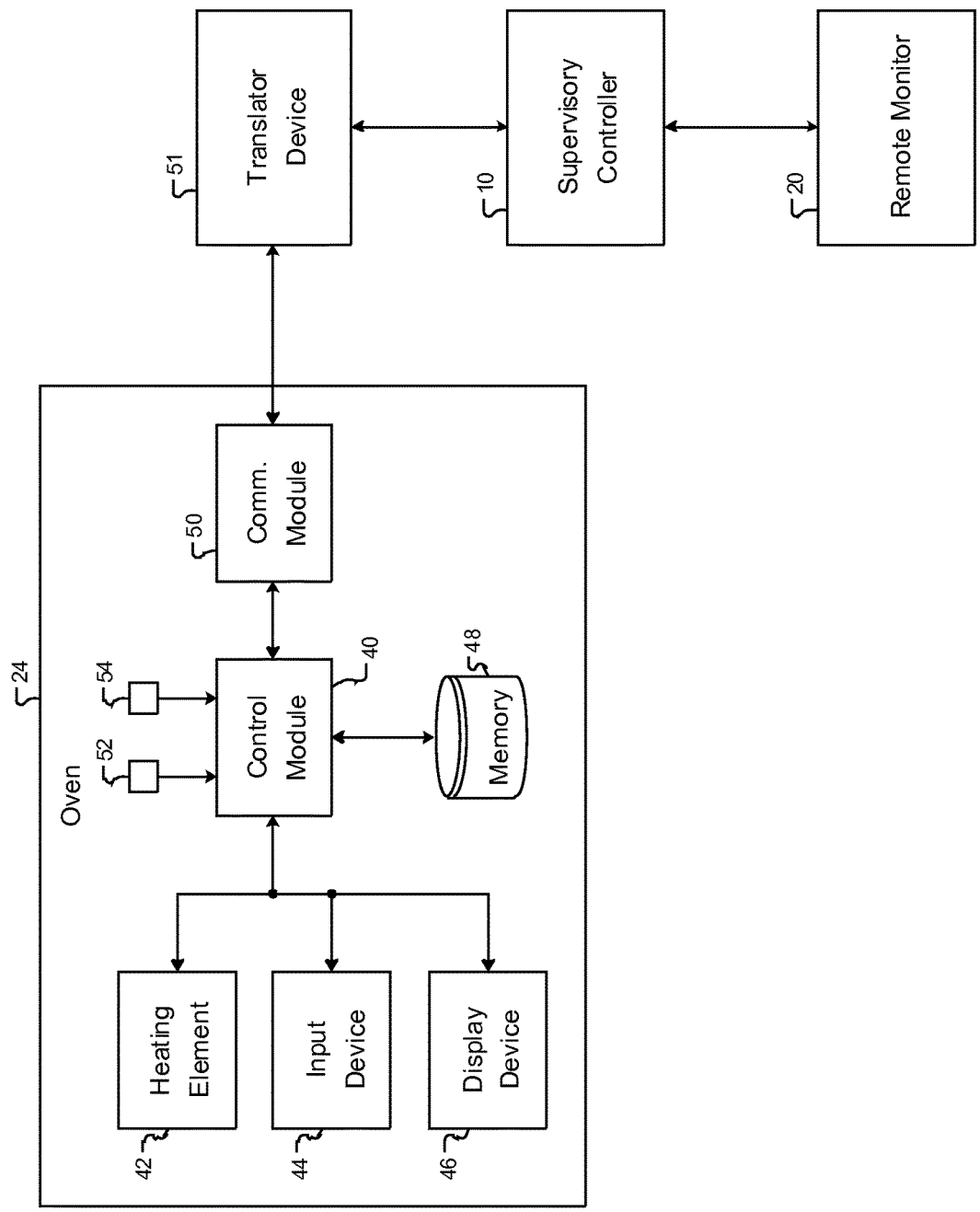
FIG. 3E is a block diagram of an example menu and firmware management system for equipment.

With reference to FIG. 3E, another embodiment is shown that includes a translator device 51 between the oven 24 and the supervisory controller 10. For example, legacy equipment may not be originally configured for communication with a supervisory controller 10. For example, the legacy equipment may not be configured with the appropriate communication protocols or functionality sufficient to allow communication with a supervisory controller 10. In such case, a translator device 51 may be used to facilitate communication between the oven 24 and the supervisory controller 10. The translator device 51 may include the appropriate communication protocols and functionality to communicate with the supervisory controller 10 and then appropriately translate the communications to or from the communication module 50 of the oven 24.

With reference again to FIGS. 3A to 3E, the memory 48 stores the menu of food items associated with the kitchen equipment 14, in this case the oven 24. For example, the menu of food items may correspond to food items displayed in the user interface 60. Further, for each food item in the menu, the memory stores associated operating parameters for the food item necessary for operation of the kitchen equipment 14, in this case the oven 24, in preparation of the selected food item. For example, a user of the oven 24 may select the chicken item for preparation. The user's selection may be inputted to the input device 44 of the oven (FIGS. 3A and 3E) or to the user interface device 53 (FIGS. 3B to 3D) and communicated to the control module 40. The control module 40 then accesses the memory 48 to retrieve the operating parameters associated with the selected food item, for example the chicken item. For example, the operating parameters may include a cook temperature and a cook time. The control module 40 may then control the heating element 42 based on the indicated cook temperature. If the oven was not preheated, the control module 40 may control the heating element 42 to heat up to the appropriate cook temperature, as required. The control module 40 receives oven temperature data from an oven temperature sensor 52. The control module 40 also receives electrical data, for example electrical current data, from an electrical sensor 54, such as an electrical current or voltage sensor.

Once the oven 24 reaches the indicated cook temperature, the control module 40 may control the display device 46 or the user interface device 53 to display an indication that the oven is ready and has reached the appropriate cook temperature. The user may then insert the food item into the oven and press a "start" button on the input device 44 or the user interface device 53 to start cooking the food item. Alternatively, the oven 24 may include a door sensor and may initiate the cook time period based on an opening and closing of the oven door after the oven 24 has been preheated. The control module 40 may then monitor the cook time by monitoring the time period from when the "start" button was selected or from when the oven door was opened and closed. Once the cook time has been reached, the control module 40 may control the display device 46 or the user interface device 53 to indicate that the cooking has completed. Alternatively, the oven 24 may include another output device, such as an audio output device, such that the control module 40 can control the audio output device to buzz or ring when the cooking has completed. Once the cooking has completed, the user may remove the food item from the oven 24 and the oven 24 may then wait for the next food item to be selected from the user interface 60 for preparation.

Although the examples of FIGS. 3A to 3E and 4A to 4B include an oven 24, each of the pieces of kitchen equipment 14 may include the described components for performing the similar functionality for preparing appropriate food items with the particular piece of kitchen equipment 14. Further, each of the pieces of kitchen equipment 14 may include an associated memory 48 that stores associated operating parameters, for example cook temperatures, cook times, or other data, used by the piece of kitchen equipment 14 for use in preparing food. As a further example, if the kitchen equipment is a grill with top and bottom grill plates, the operating parameters may include a time or pressure for the top grill plate to be lowed onto the food item. Additionally, the operating parameters may include a length of time or amount or pressure of steam to be applied to the food item. Any other associated data utilized by kitchen equipment 14 in preparing food items or related operations may be stored in the associated memory 48 and utilized by the control module 40 upon an appropriate selection being received from the user interface 60 and input device 44.

Through communication with the supervisory controller 10, the control module 40 may receive updated menus and/or updated firmware for storage in the memory. For example, the updated menus may include additions to or deletions from the listed food items. Alternatively, the updated menus may include new menu structures such that selection of a food item results in a second nested menu that includes various options associated with the selected food item. Additionally, the updated menu may include revisions or updates to the operating parameters, such as modifications to the cook times or cook temperatures. Additionally, the updated menu may include updated icons 64 or updated text descriptions 62 for display in a user interface 60. When updated menus and/or updated firmware are received by the control module 40 from the supervisory controller 10, the control module 40 may install the updated menus and/or updated firmware. For example, the control module 40 may set a flag indicating that updated menus and/or updated firmware are available and stored in memory 48, such that upon startup the updated menus and/or updated firmware are installed. The control module 40 may install the updated menus and/or updated firmware upon receipt, upon the next startup, or at a designated time, such as upon shutdown at the end of a business day. As discussed further below, once the updated menus and/or updated firmware are installed, the control module 40 may communicate a confirmation message back to the supervisory controller 10. If an error occurred during the installation, the control module 40 may communicate an error message back to the supervisory controller 10.

In addition to communication related to updated menus and firmware, the control module 40 may also communicate usage and energy data to the supervisory controller 10. For example, the control module 40 may log cook times and temperatures and periodically, for example once per day, week, or month, the control module 40 may communicate a usage log to the supervisory controller 10. Additionally, the control module 40 may monitor electrical data, such as electrical power data, electrical current data, or electrical voltage data received from one or more electrical sensors 54 and may communicate the electrical energy data to the supervisory controller 10. The supervisory controller 10 may communicate the usage and energy data to the remote monitor 20 for additional review and analysis for reporting and diagnostics purposes. Additionally, if the kitchen equipment 14 utilizes gas, water, or other resources, data related to the gas, water, or other resource usage may be communicated by the control module 40 to the supervisory controller 10.

Figure 5:
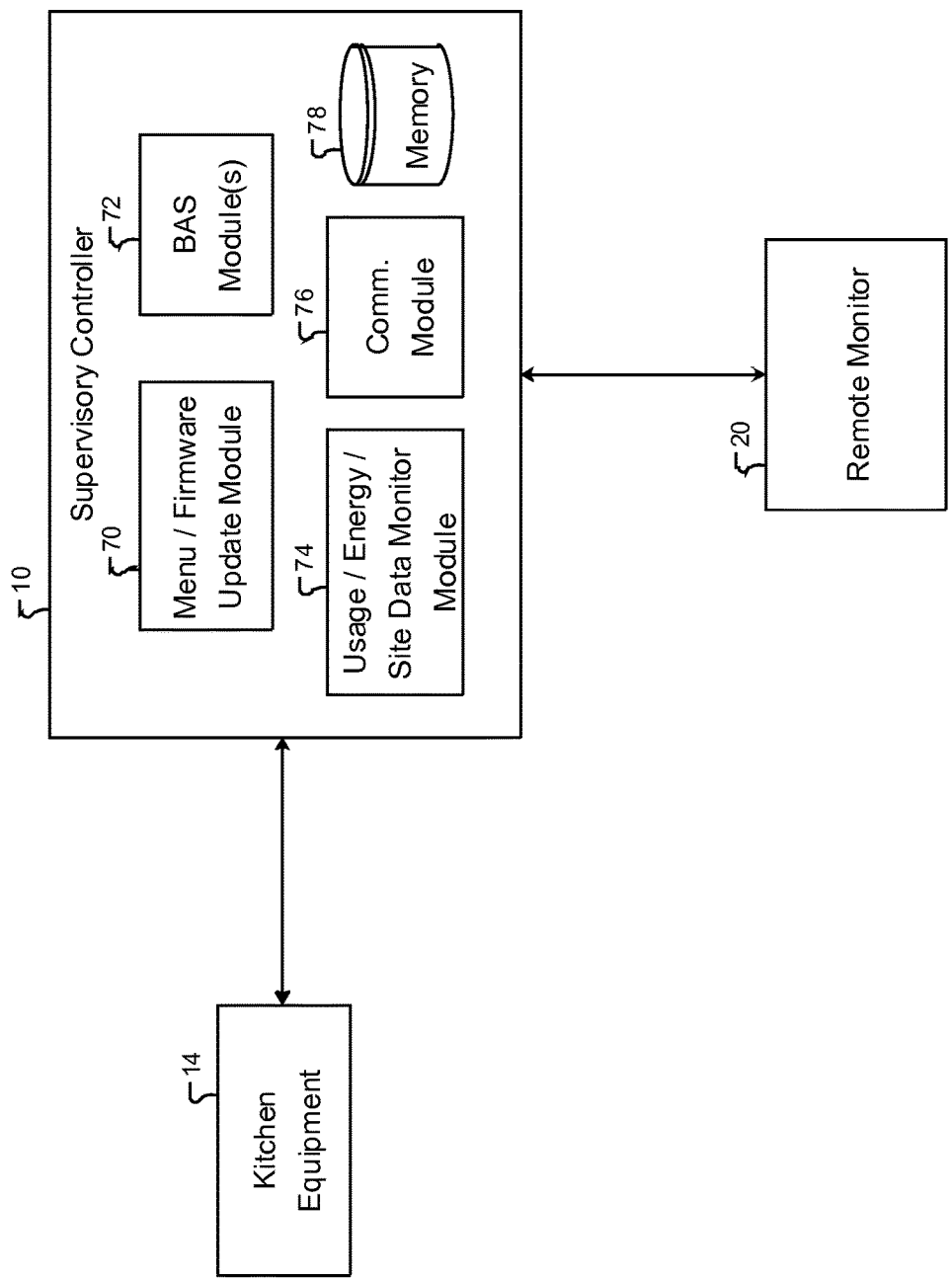
FIG. 5 is a block diagram of an example menu and firmware management system for equipment.

With reference to FIG. 5, further details are shown for the supervisory controller 10. Specifically, the supervisory controller 10 may include a menu/firmware update module 70 for operations and communication related to receiving updated menus and firmware from the remote monitor 20 and communicating the updated menus and firmware to the kitchen equipment 14. Additionally, the supervisory controller 10 may include one or more BAS module(s) 72 for operations and communications associated with the various building systems 16. Additionally, the supervisory controller 10 may include a usage/energy/site data monitor module 74 for operations and communications related to receiving, monitoring, and communicating usage, energy, and other site data from the kitchen equipment 14, building systems 16, and environmental sensors 18 to the remote monitor 20. Additionally, the supervisory controller 10 includes a communication module 76 for operations associated with communicating with the kitchen equipment 14, building systems 16, and the remote monitor 20.

Additionally, the supervisory controller 10 includes a memory 78 that stores, for example, information needed for the various operations and communications described. For example, the memory 78 may include a listing of all pieces of communicating kitchen equipment 14 at the site, including identification information. Such identification information, for example, may include a unique network identification, a serial number, a model number, and/or other identifying information. In this way, the supervisory controller 10 is able to track and monitor all communicating equipment, such as communicating kitchen equipment 14, located and in operation at the site 12. As equipment joins or leaves the system, the supervisory controller 10 updates the memory and equipment listing as appropriate. For example, each piece of kitchen equipment 14 may include a unique identification, such as a serial number, stored in memory 48, along with model, manufacturer, and other associated information. As described in further detail below, the supervisory controller 10 may retrieve the identification information for all connected kitchen equipment 14 and build an asset list of kitchen equipment 14 located at the associated site 12. The supervisory controller 10 may also retrieve the associated model, manufacturer, and other associated information for the connected kitchen equipment 14. The asset list and associated information may then be communicated to a remote monitor 20 to populate an enterprise wide equipment database 90 (shown in FIG. 6) stored at the remote monitor 20, as described in further detail below.

Figure 6:
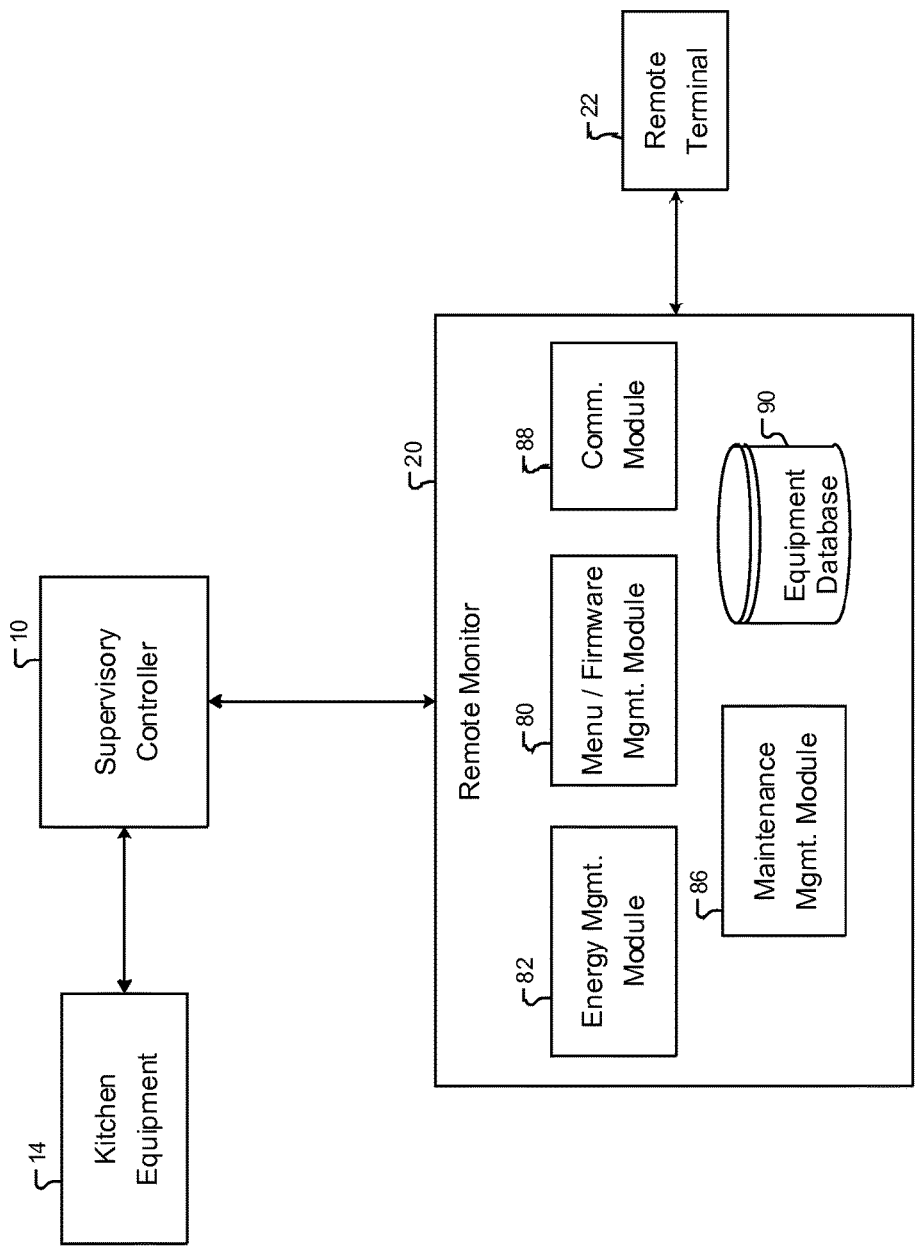
FIG. 6 is a block diagram of an example menu and firmware management system for equipment.

With reference to FIG. 6, further details are shown for the remote monitor 20. Specifically, the remote monitor 20 may include a menu/firmware management module 80 for operations and communication related to receiving updated menus and firmware from the remote terminal 22 and communicating the updated menus and firmware to the supervisory controller 10. Additionally, the remote monitor 20 includes an energy management module 82 for operations and communication related to reviewing and analyzing energy and usage data from the supervisory controller 10 and generating energy reports, recommendations, and analysis based on the received energy data. Additionally, the remote monitor 20 includes a maintenance management module 86 for operations and communications related to reviewing and analyzing energy and usage data from the supervisory controller 10 and generating maintenance alerts, recommendations, and reports for scheduled maintenance and/or predictive maintenance. Additionally, the remote monitor 20 includes a communication module 88 for operations associated with communicating with the supervisory controller 10 and the remote terminal 22.

Additionally, the remote monitor 20 includes an equipment database 90. The equipment database 90 includes a listing of the various pieces of kitchen equipment 14, including all associated identification information and the particular associated site locations. As described above, asset information may be received from each of the connected supervisory controllers 10. In this way, if updated menus or firmware are received for a particular model or type of kitchen equipment 14, the remote monitor 20 can access the equipment database 90 to determine the particular supervisory controllers 10 that need to receive the updated menus or firmware for installation at the particular kitchen equipment 14.

Figure 7:
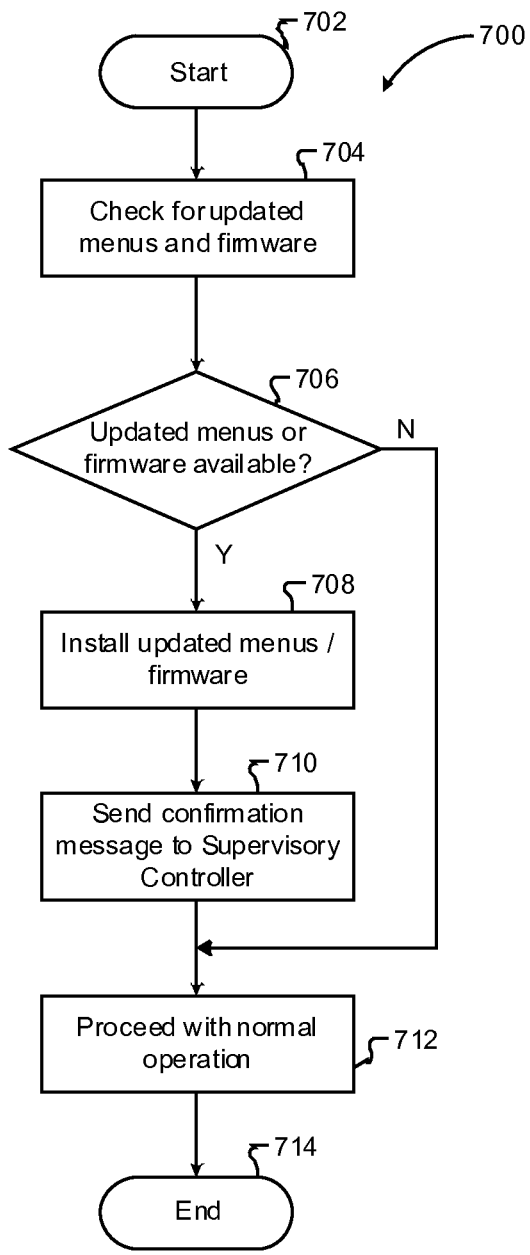
FIG. 7 is a flowchart depicting an example method for menu and firmware management for equipment.

With reference to FIG. 7, a control algorithm 700 is shown for updating menus or firmware for the kitchen equipment 14. The control algorithm 700 may be performed by a control module 40 associated with a particular piece of kitchen equipment, such as, for example, the control module 40 shown for the ovens 24 in FIGS. 3A to 3E. While the particular components of the ovens 24 shown in FIGS. 3A to 3E are referenced here for purposes of illustration, any particular piece of kitchen equipment 14, with an associated control module 40, can perform the algorithm 700. The control algorithm 700 may be performed by the control module 70 upon startup or shutdown of the kitchen equipment 14 or at a scheduled or instructed time. The control algorithm 700 starts at 702. At 704, the control module 40 checks for updated menus and firmware. For example, the control module 40 can check to determine whether updated menus or firmware have been received from the supervisory controller 10 and copied into memory 48.

At 706, the control module 40 determines whether updates menus or firmware are available. At 706, when updated menus or firmware are available, the control module 40 proceeds to 708 and installs the updated menus or firmware, as appropriate. Otherwise, at 706 when updated menus or firmware are not available, the control module 40 proceeds to 712. After installation of the updated menus or firmware, the control module 40 proceeds to 710. At 710, when installation of the updated menus or firmware was successful, the control module 40 sends a confirmation message back to the supervisory controller 10. The control module 40 then proceeds to 712 and proceeds with normal operation. For example, if the control algorithm 700 is performed at startup, the control module 40 can proceed with normal startup operation. If the control algorithm 700 is performed at shutdown, the control module 40 can proceed with normal shutdown procedures. The control algorithm 700 ends at 714.

Figure 8A:
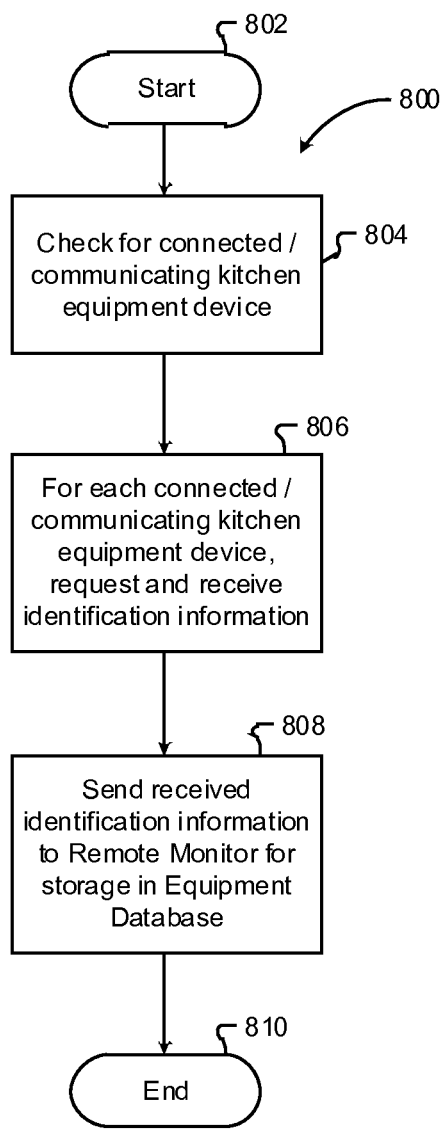
FIG. 8A is a flowchart depicting an example method for menu and firmware management for equipment.

With reference to FIG. 8A, a control algorithm 800 is shown for identifying communicating kitchen equipment 14 at a site 12. The control algorithm 800 may be performed by a supervisory controller 10 upon installation or initialization of the supervisory controller 10 and/or a BAS 11 at a site 12. Additionally, control algorithm 800 may be periodically repeated, as necessary. The control algorithm 800 starts at 802. At 804, the supervisory controller 10 checks for connected and communicating kitchen equipment devices. For example, the supervisory controller 10 may send out a request for response to all devices on the network and may wait to receive replies. At 806, for each connected and communicating kitchen equipment device on the network, the supervisory controller 10 may request and then receive associated identification information for the particular piece of kitchen equipment 14. For example, the replies from the kitchen equipment 14 may include associated identification information for the particular piece of kitchen equipment 14, such as serial number, manufacturer, and/or model name, number or type information. The supervisory controller 10 may store the identification information in the supervisory controller's memory 78. In addition, at 808 the supervisory controller 10 sends the received identification information to the remote monitor 20 for storage in the equipment database 90. The control algorithm 800 ends at 810.

Figure 8B:
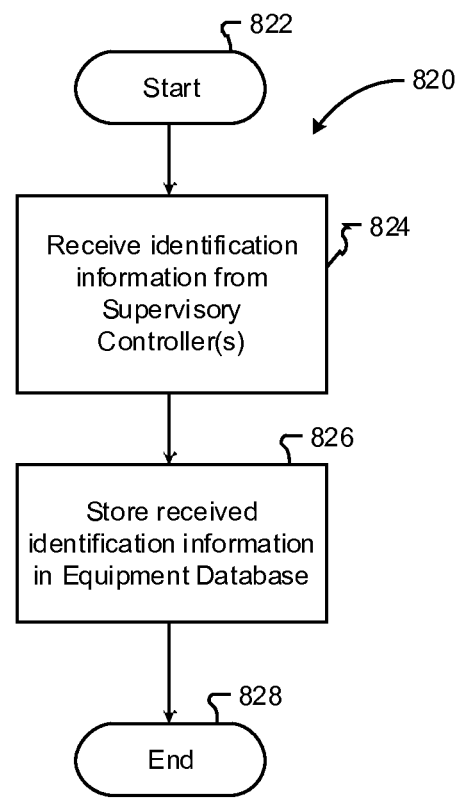
FIG. 8B is a flowchart depicting an example method for menu and firmware management for equipment.

With reference to FIG. 8B, a control algorithm 820 is shown for receiving identification information from the supervisory controller 10. The control algorithm 820 may be performed by the remote monitor 20 and starts at 822. At 824, the remote monitor 20 receives the identification information for the communicating kitchen equipment from the supervisory controller(s). At 826, the remote monitor 20 stores the received identification in the equipment database 90. The control algorithm 820 ends at 828.

Figure 9:
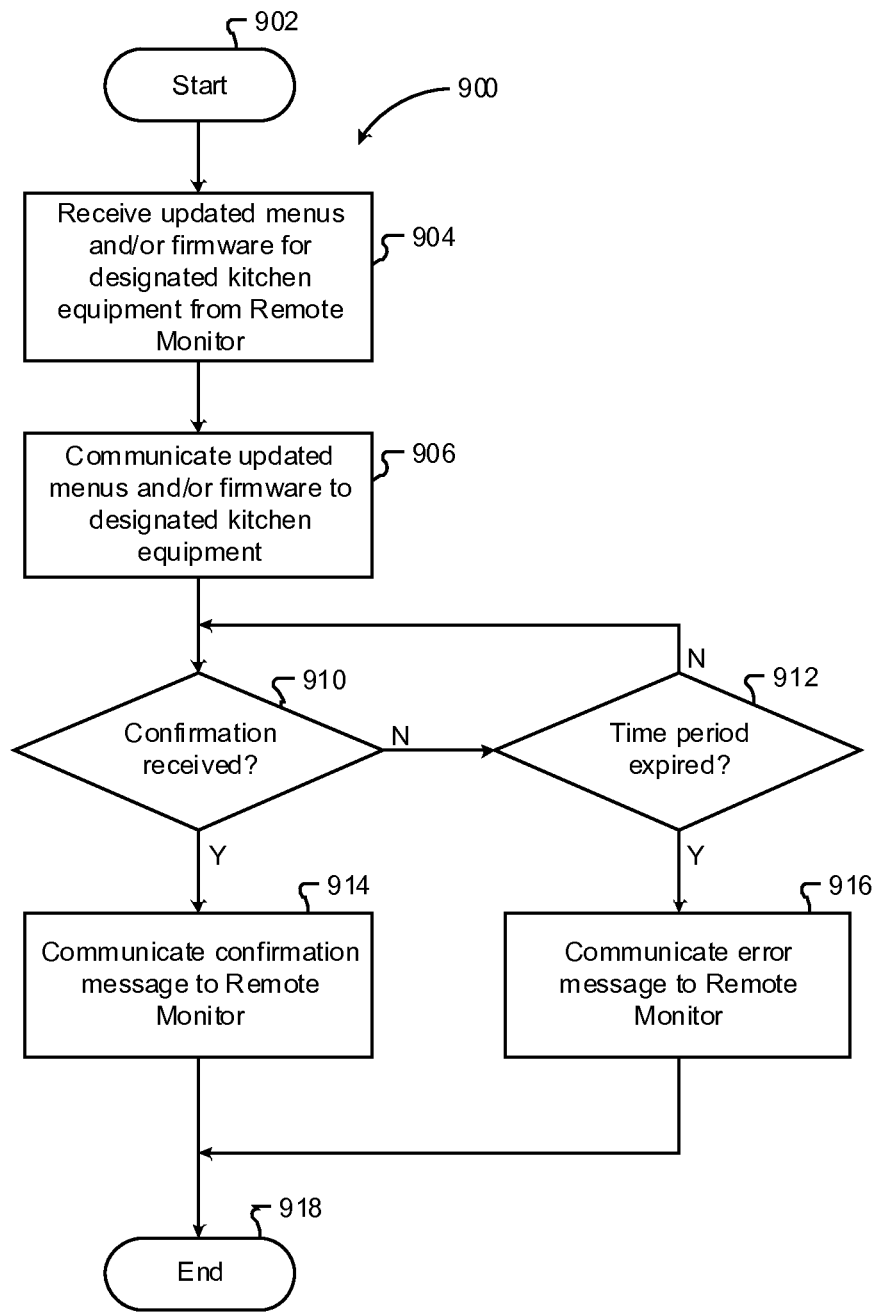
FIG. 9 is a flowchart depicting an example method for menu and firmware management for equipment.

With reference to FIG. 9, a control algorithm 900 is shown for updating menus or firmware for the kitchen equipment 14. The control algorithm 900 may be performed by a supervisory controller 10 and starts at 902. At 904, the supervisory controller 10 receives updated menus and/or firmware for designated kitchen equipment from the remote monitor 20. For example, the remote monitor 20 may send updated menus or firmware and may indicate that the updated menus or firmware are to be installed on particular pieces of kitchen equipment 14 or particular types of classes of kitchen equipment 14. At 906, the supervisory controller 10 communicates the updated menus and/or firmware to the designated kitchen equipment 14. The kitchen equipment 14 then installs the updated menus and/or firmware, as discussed above with respect to FIG. 7. With continued reference to FIG. 9, at 910 the supervisory controller 10 determines whether a confirmation message has been received from the kitchen equipment 14. When the confirmation message has not been received, the supervisory controller 10 proceeds to 912 and determines whether a predetermined time period has expired. When the predetermined time period has not expired, the supervisory controller 10 loops back to 910. The supervisory controller 10 proceeds with steps 910 and 912 until either the confirmation message is received or the predetermined time period expires. When the confirmation message is received at 910, the supervisory controller 10 proceeds to 914 and communicates a confirmation message back to the remote monitor 20. When the time period expires at 912, the supervisory controller 10 proceeds to 916 and communicates an error message back to the remote monitor 20. The control algorithm 900 ends at 918.

Figure 10:
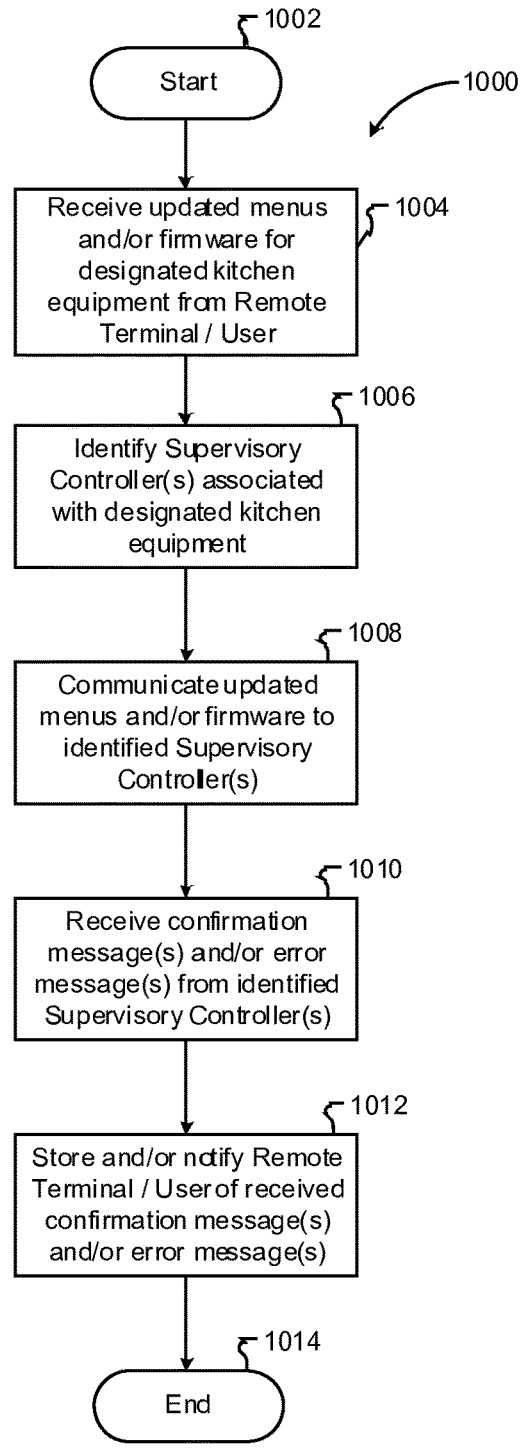
FIG. 10 is a flowchart depicting an example method for menu and firmware management for equipment.

With reference to FIG. 10, a control algorithm 1000 is shown for updating menus or firmware for the kitchen equipment 14. The control algorithm 1000 may be performed by the remote monitor 20 and starts at 1002. At 1004, the remote monitor 20 receives updated menus and/or firmware for designated kitchen equipment from a user at the remote terminal 22. As discussed above, the user may be an administrator that manages menus and firmware for various kitchen equipment 14 utilized by a food services company across an enterprise comprising multiples sites 12. The user may login to the remote monitor 20 with the remote terminal 22 to communicate the updated menus or firmware to the remote monitor 20. At 1006, the remote monitor 20 identifies the particular supervisory controller(s) 10 associated with the received updated menus and/or firmware by accessing the listing of equipment in the equipment database 90. At 1008, the remote monitor 20 communicates the updated menus and/or firmware to the identified supervisory controller(s) 10. The supervisory controller(s) 10 then proceed with installation of the updated menus and/or firmware, as discussed above with respect to FIG. 9. At 1010, the remote monitor 20 receives either confirmation messages or error messages from the supervisory controllers 10 indicating that the installation of the updated menus and/or firmware was either successful or not successful. At 1012, the remote monitor 20 stores the received confirmation messages and error messages and notifies the user at the remote terminal of the received confirmation messages and/or error messages. The control algorithm 1000 ends at 1014.

In this way, as described above with respect to FIGS. 7, 8A, 8B, 9, and 10, the supervisory controller 10, remote monitor 20 and remote terminal 22 work together to perform appropriate communication and operation to install the updated menus and/or firmware for the appropriate kitchen equipment 14.

In addition to updating menus and firmware for the kitchen equipment 14, the systems and methods described herein can also receive, review, and analyze energy and usage data and generate notifications for scheduled or predicted maintenance tasks.

Figure 11:
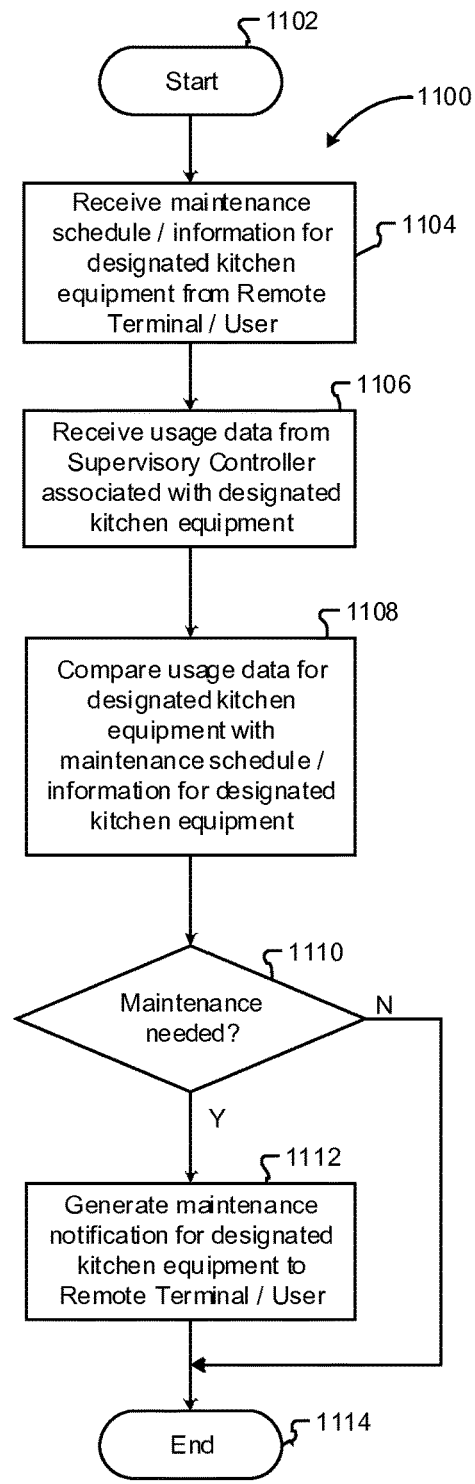
FIG. 11 is a flowchart depicting an example method for menu and firmware management for equipment.

For example, with reference to FIG. 11, a control algorithm 1100 is shown for generating maintenance notifications for maintenance on designated kitchen equipment 14. The control algorithm 1100 may be performed by the remote monitor 20 and starts at 1102. At 1104, the remote monitor 20 receives maintenance schedule and/or maintenance information for designated kitchen equipment from a user at the remote terminal 22. The maintenance schedule and/or information may indicate a particular event and an associated maintenance task. For example, the maintenance schedule may indicate that, for a particular piece of kitchen equipment 14, once the kitchen equipment 14 has been operated for a certain period of time or has been operated a certain number of cycles, then a particular maintenance task should be performed. For example, the maintenance schedule may indicate that once the kitchen equipment has been operated for a certain period of time or for a certain number of cycles, then a filter or other component may need to be replaced. At 1106, the remote monitor 20 recites the usage data from the supervisory controller 10 for the designated kitchen equipment. At 1108, the remote monitor 20 compares the usage data with the maintenance schedule and information for the designated kitchen equipment. At 1110, the remote monitor 20 determines whether maintenance is needed based on the comparison. For example, the remote monitor 20 may compare the usage data with a usage threshold, such as a usage time period threshold or a cycles threshold, to determine whether maintenance is needed. Additionally, the remote monitor 20 may utilize predictive maintenance algorithms, based on the received usage and operational data for the kitchen equipment 14, to predict that an equipment or component failure may occur and/or to predict that maintenance is required. For example, the remote monitor 20 may determine that a filter of the kitchen equipment 14 is dirty and needs replacing based on increased energy consumption by the kitchen equipment 14. Additionally, the remote monitor 20 may determine that a heating element of the kitchen equipment may fail in the near future, based on energy consumption and usage data, for example, and predict that the heating element needs to be replaced soon. Additional predictive maintenance algorithms may be performed by the remote monitor 20 based on additional types of data received by sensors associated with particular kitchen equipment 14, or other equipment or systems, at a particular site 12. At 1110, when maintenance is needed, at 1112 the remote monitor 20 generates a maintenance notification for designated kitchen equipment 14 and communicates the notification to a user at the remote terminal 22. At 1114, the control algorithm 1100 ends.

Alternatively, the maintenance information received by the remote terminal at 1104 may simply indicate that a component needs to be replaced regardless of usage data. For example, the maintenance information may indicate that a component, such as an oven door hinge, is defective on all units of a particular model and needs to be replaced.

Alternatively, the maintenance information may include other thresholds for comparison. For example, the maintenance information may indicate that once a piece of kitchen equipment 14 is drawing excessive current above a predetermined threshold that maintenance may be required. For example, the maintenance may include cleaning, lubrication, filter changes, replacement of heating elements, replacement of wear parts, etc.

Figure 12:
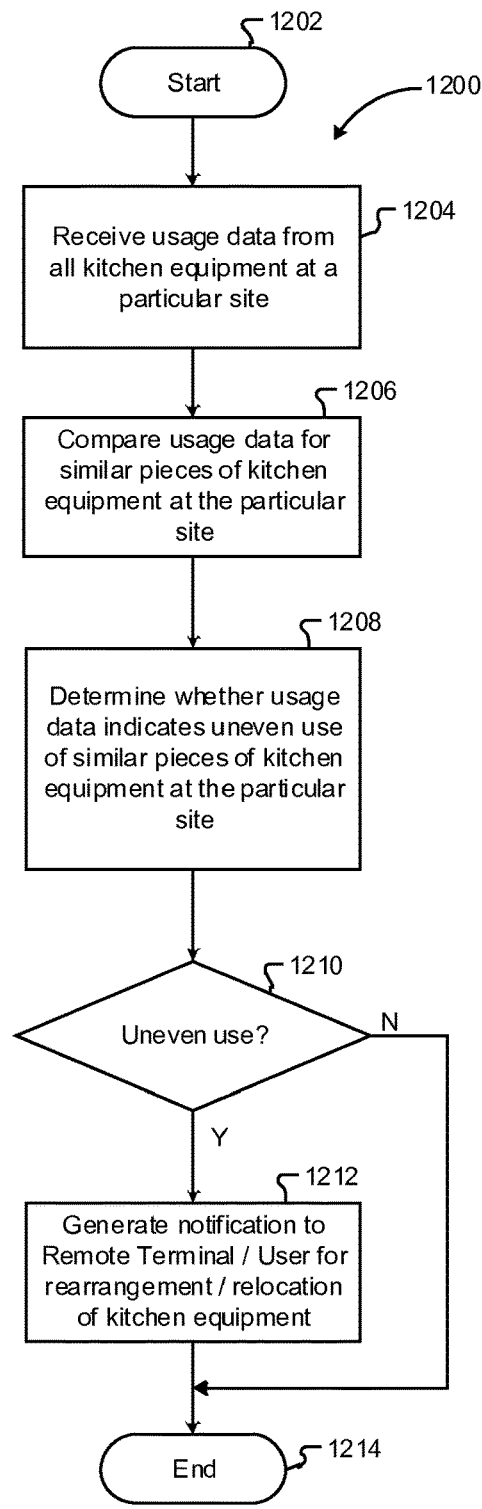
FIG. 12 is a flowchart depicting an example method for menu and firmware management for equipment.

With reference to FIG. 12, a control algorithm 1200 is shown for generating a notification of uneven use of kitchen equipment 14 at a particular site. At sites with multiple pieces of the same type of kitchen equipment, for example, multiple fryers, multiple ovens, etc., it may be the case that one of the pieces of equipment is used significantly more than the other piece of equipment. For example, if a site 12 has two fryers, the usage data may indicate that one of the fryers is used eighty percent of the time while the other fryer is used twenty percent of the time. This may be the case even though the fryers operate identically and were installed at the site at the same time. The control algorithm 1200 identifies uneven use of equipment of this type and generates a notification to advise a user, owner, or operator at the site to swap locations of the two fryers.

The control algorithm 1200 may be performed by the remote monitor 20 and starts at 1202. At 1204, the remote monitor receives usage data from all of the kitchen equipment 14 at a particular site. At 1206, the remote monitor 20 compares the usage data for similar pieces of kitchen equipment 14 at a particular site 12. At 1208, the remote monitor determines whether the usage data indicates an uneven use of similar pieces of kitchen equipment 14 at the particular site 12. For example, as mentioned above, the usage data may indicate that one of the pieces of equipment is used eighty percent of the time while the other is used only twenty percent of the time. At 1210, the remote monitor 20 determines whether there is an uneven use situation by comparing the usage data for the similar pieces of kitchen equipment. At 1212, when uneven use is determined, the remote monitor 20 generates a notification to a user at the remote terminal 22. The notification, for example, may advise of the uneven use and recommend that the locations of the two pieces of equipment be swapped. The control algorithm ends at 1214.

Figures 13A, 13B:
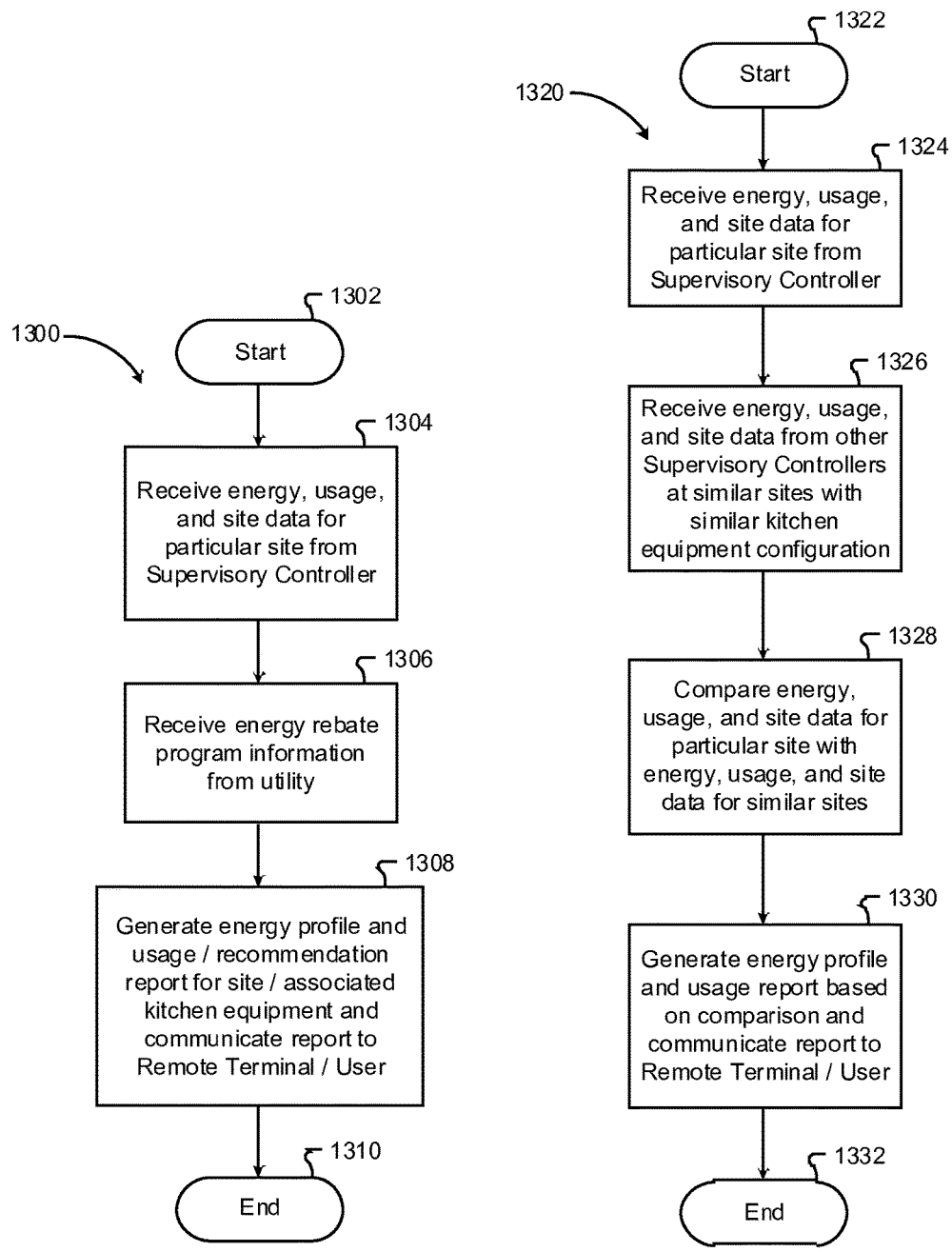
FIG. 13A is a flowchart depicting an example method for menu and firmware management for equipment.
FIG. 13B is a flowchart depicting an example method for menu and firmware management for equipment.

With reference to FIG. 13A, a control algorithm 1300 is shown for generating energy profile, usage, and recommendation reports for a particular site 12. The control algorithm 1300 may be performed by the remote monitor 20 and starts at 1302. At 1304, the remote monitor 20 receives energy, usage, and site data for a particular site 12 from the supervisory controller 10 for that site 12. At 1306, the remote monitor 20 receives energy rebate program information from a utility company. For example, the utility company may provide energy rebate program information at its website and the remote monitor 20 may retrieve the energy rebate program information from the website. Additionally or alternatively, energy rebate program information may be collected from one or more utility companies across a geographic area associated with various sites 12 of a particular enterprise and stored at a central location in an energy rebate program information database for the enterprise. In this way, the remote monitor 20 may retrieve energy rebate program information from the energy rebate program information database. The energy rebate program information may include rebate offers by the utility company for replacing equipment with more energy efficient equipment or using equipment during off-peak hours.

At 1308, the remote monitor 20 generates energy profile, use reports, recommendation reports, and other energy related reports for the site and associated kitchen equipment 14 based on the received energy usage and site data for the particular site 12 and based on any available rebate program information. For example, the remote monitor 20 may generate an energy profile report showing energy usage at the site 12 over a predetermined period of time. The energy profile report may correlate energy with outdoor and/or indoor ambient temperatures at the site 12. Additionally, the report may include a recommendation to reduce energy usage by reconfigured equipment, adjusting equipment operating parameters, replacing equipment, etc. Additionally, the report may include a recommendation to participate in an available energy rebate program offered by the utility company. Additionally, actual energy usage data may be compared with benchmark energy usage specification data provided, for example, by a manufacturer of kitchen equipment 14 and the report may provide details regarding such a comparison. Additionally, the remote monitor 20 may calculate an expected energy usage for the site and associated kitchen equipment 14 based on environmental conditions and usage data, compare the expected energy usage with actual energy usage, and include the details of the comparison in the report. Additionally, the remote monitor 20 may retrieve energy bill data associated with a particular site and compare the energy usage data indicated on the energy bill with the actual energy usage data to determine if there are any discrepancies between the actual energy usage data and the energy usage indicated on the energy bill. The details of the comparison may be included in the report. At 1308, the energy profile, usage, recommendation report, and/or other energy related reports are communicated to the user at the remote terminal. The control algorithm ends at 1310.

With reference to FIG. 13B, a control algorithm 1320 is shown for comparing energy usage for a particular site with energy usage at similarly configured sites. The control algorithm 1320 may be performed by the remote monitor 20 and starts at 1322. At 1324, the remote monitor 20 receives energy, usage, and site data for a particular site 12 from the supervisory controller 10 for the particular site 12. At 1326, the remote monitor 20 receives energy, usage, and site data from supervisory controllers 10 at similar sites 12 with similar kitchen equipment configurations. At 1328, the remote monitor 20 compares the energy, usage and site data for the particular site with the energy, usage, and site data for the similar sites. At 1330, the remote monitor generates an energy profile and usage report based on the comparison to show how the energy usage at the particular site compares to sites with similar kitchen equipment configurations. The control algorithm 1320 ends at 1332.

Figure 14A:
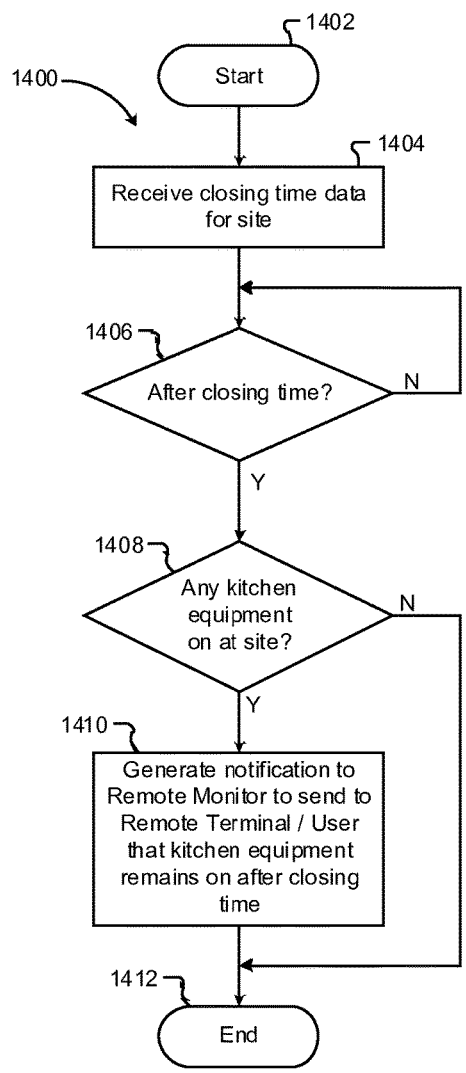
FIG. 14A is a flowchart depicting an example method for menu and firmware management for equipment.
Figure 14B:
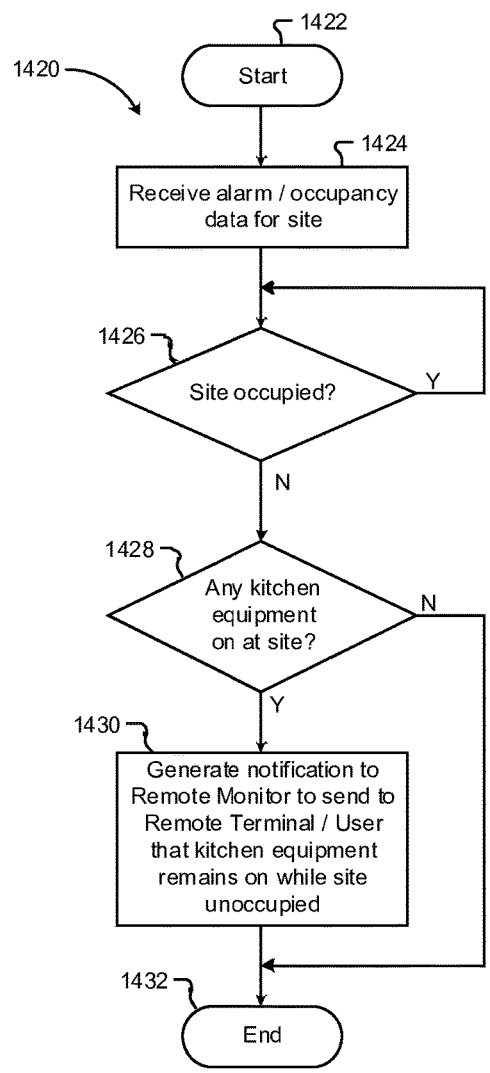
FIG. 14B is a flowchart depicting an example method for menu and firmware management for equipment.

With reference to FIGS. 14A and 14B, control algorithms 1400, 1420 are shown for generating a notification that kitchen equipment has been left on after operating hours of the associated site 12. The control algorithms 1400, 1420 may be performed by the supervisory controller 10 and/or by the remote monitor 20. For purposes of this example, the control algorithms 1400, 1420 are discussed as being performed by the supervisory controller 10. Control algorithm 1400 starts at 1402. At 1404, the supervisory controller 10 receives closing time data for a particular site 12. At 1406, the supervisory controller 10 determines whether it is currently past closing time for the site. When it is not, the supervisory controller 10 loops back to 1406. When it is after closing time 1406, the supervisory controller 10 proceeds to 1408 and determines whether any kitchen equipment 14 remains on at the site. When no kitchen equipment is on at 1408, the supervisory controller 10 proceeds to 1412 and ends. At 1408, when kitchen equipment 14 remains on at the site after closing time, the supervisory controller 10 generates a notification to send to the remote monitor 20 to send to the user at the remote terminal 22 that kitchen equipment 14 remains on after closing time. At 1412, the control algorithm 1400 ends.

With reference to FIG. 14B, instead of receiving closing time data for a site, the supervisory controller 10 may receive alarm or occupancy data from an associated alarm system for the site. The algorithm 1420 starts at 1422. At 1424, the supervisory controller 10 receives alarm/occupancy data for the site 12 from a security system 16f (shown in FIG. 1A). At 1426, the supervisory controller 10 determines whether the site 12 is occupied based on the alarm/occupancy data. At 1426, when the site 12 is occupied, the supervisory controller 10 loops back to 1426. When the site 12 is not occupied, the supervisory controller 10 proceeds to 1428 and determines whether any kitchen equipment remains on at the site. When kitchen equipment 14 remains on while the site is not occupied, the supervisory controller 10 generates a notification to send to the remote monitor 20 to send to the user at the remote terminal 22 that kitchen equipment 14 remains on while the site 12 is not occupied. At 1432, the control algorithm 1420 ends.

Figure 15:
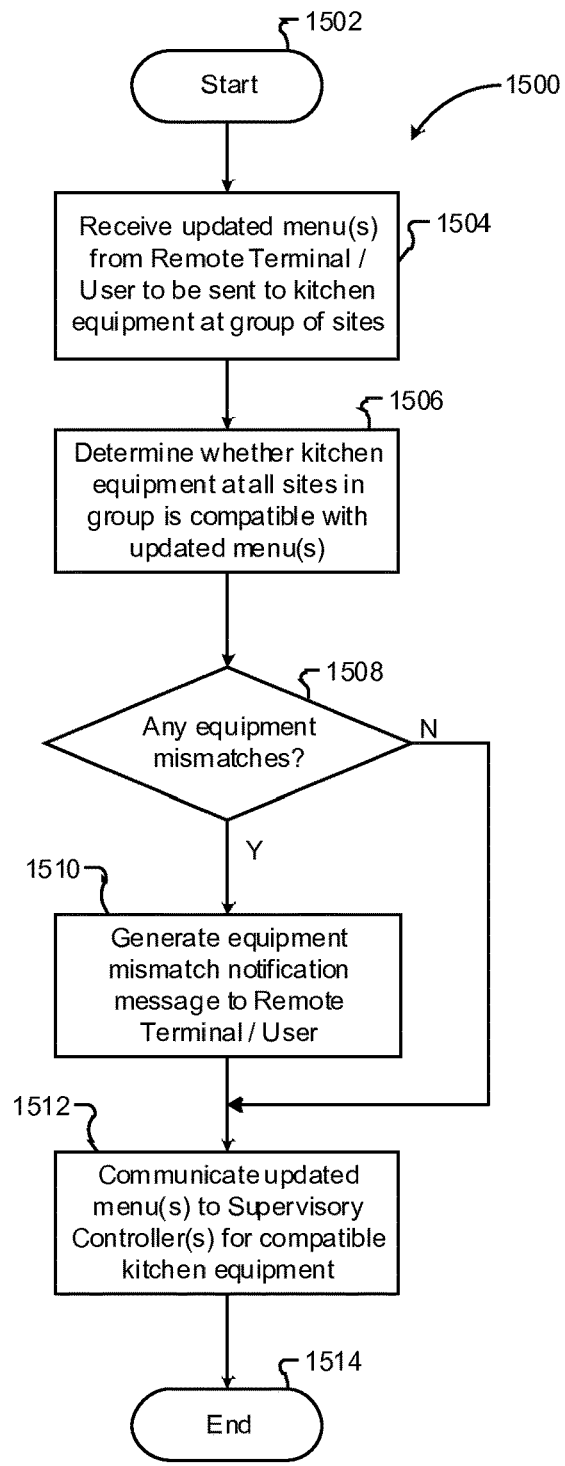
FIG. 15 is a flowchart depicting an example method for menu and firmware management for equipment.

With reference to FIG. 15, a control algorithm 1500 is shown for determining whether there are any equipment mismatches associated with a proposed menu update for particular kitchen equipment 14. The control algorithm 1500 may be performed by the remote monitor 20 and starts at 1502. At 1504, the remote monitor receives updated menu(s) from a user at the remote terminal to be sent to kitchen equipment 14 at a particular site 12 or group of sites 12. At 1506, the remote monitor determines whether the kitchen equipment 14 at all of the sites 12 in the group is compatible with the updated menu. For example, the updated menu may include a new menu item that requires equipment with a particular option for proper preparation of the menu item. At 1508, the remote monitor 20 determines whether there are any equipment mismatches such that a particular site 12 does not include kitchen equipment with the particular option necessary for preparation of the new menu item. At 1508, when there are no equipment mismatches, the remote monitor 20 proceeds to 1512. At 1508, when there is an equipment mismatch, the remote monitor 20 proceeds to 1510 and generates a notification message indicating an equipment mismatch to be sent to a user at the remote terminal 22. At 1512, the remote monitor 20 sends the menu updates to all supervisory controllers 10 with compatible equipment for the updated menu. At 1514, the control algorithm 1500 ends.

Figure 16:
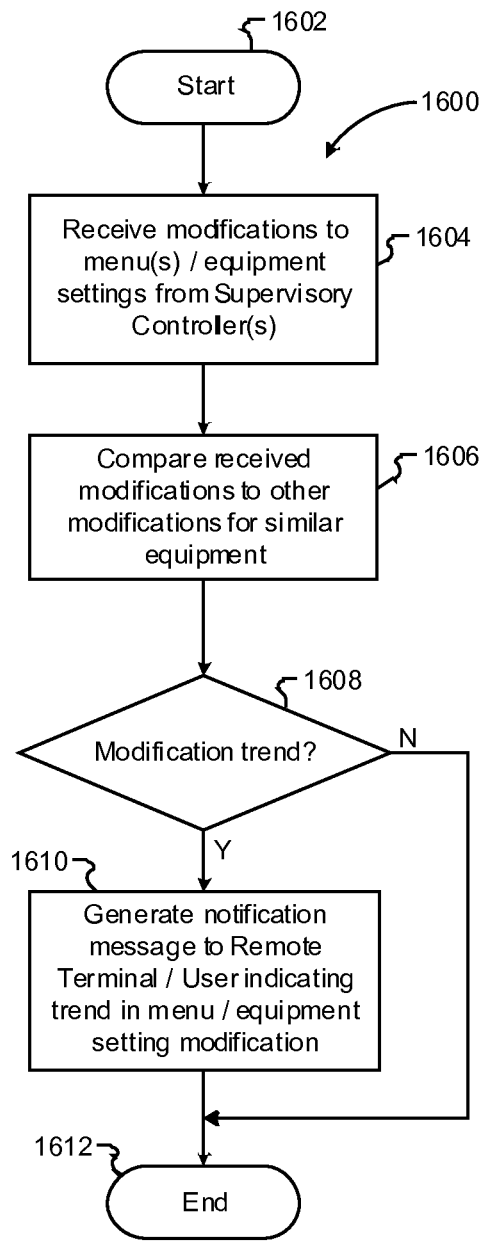
FIG. 16 is a flowchart depicting an example method for menu and firmware management for equipment.

With reference to FIG. 16, a control algorithm 1600 is shown for determining trends in menu modifications. For example, a user of kitchen equipment 14 at a site may be able to locally modify the menu and/or the particular operating parameters associated with a particular menu item. In other words, for a particular menu item, a user could locally increase or decrease a cook time or cook temperature for a particular menu item. Those local modifications can then be communicated to the supervisory controller 10 and to the remote monitor 20, which can then analyze and determine any trends in such local modifications across a number of sites 12. The control algorithm 1600 may be performed by the remote monitor 20 and starts at 1602. Alternatively, the control algorithm 1600 may be performed locally for similar kitchen equipment 14 located at a site 12. At 1604, the remote monitor 20 receives the modifications to menu(s)/equipment settings from the supervisory controller(s). At 1606, the remote monitor 20 compares the received modifications to other modifications for similar equipment at other sites 12. At 1608, the remote monitor 20 determines whether there are any identifiable trends in the modifications being performed locally at the kitchen equipment 14. When there are no trends identified, the remote monitor 20 proceeds to 1612. At 1608, when a trend in the modifications is identified the remote monitor proceeds to 1610 and generates a notification message to a user at the remote terminal 22 indicating the trend in the menu/equipment setting modifications. In addition, the remote monitor 20 may correlate menu/equipment setting modifications to revenue increases or decreases. For example, the remote monitor 20 may determine that a certain menu/equipment setting modification generally correlates to an average increase or decrease in revenue for the site. Based on the correlation, the remote monitor 20 can then appropriately notify users of the correlation. For example, the remote monitor 20 can notify users that their equipment is operating at a modified setting that correlates to decreased revenue. Alternatively, the remote monitor 20 can notify users that a possible menu/equipment setting is available that could correlate to increased revenue so that the user develops a modified menu to be pushed out to one or more supervisory controllers 10 for communication to associated kitchen equipment 14. The user can then perform further analysis to determine the reason for the identified trend and whether an updated menu should be pushed out to all sites to account for the modification trend. The control algorithm 1600 ends at 1612.

Figure 17:
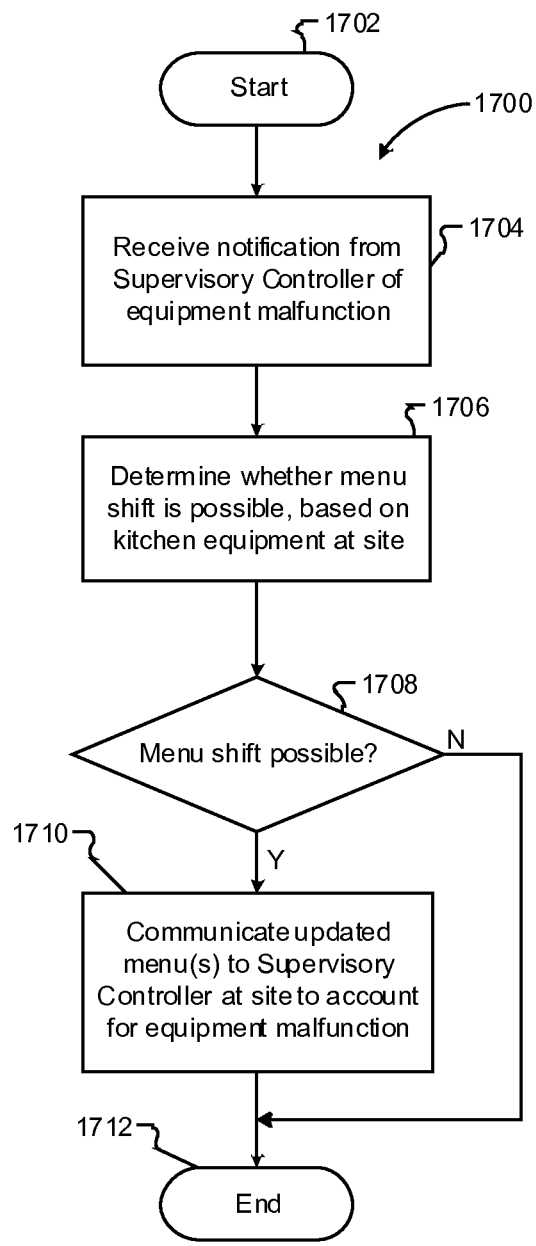
FIG. 17 is a flowchart depicting an example method for menu and firmware management for equipment.

With reference to FIG. 17, a control algorithm 1700 is shown for determining whether a modification to menus at a particular site is needed based on an equipment malfunction at the particular site. For example, when certain equipment malfunctions at a site, the control algorithm 1700 may determine whether it is possible to perform a menu shift to change the equipment associated with certain food items to account for the equipment malfunction. As an example, a particular site may have two fryers, one of which is used only for French fries and the other of which is used only for chicken strips. When one of the fryers malfunctions, the control algorithm may perform a menu shift such that the remaining functioning fryer has a menu that includes both the French fries and the chicken strips food items. The control algorithm is performed by the remote monitor 20 and starts at 1702.

At 1704, the remote monitor 20 receives a notification from a supervisory controller 10 of an equipment malfunction at a particular site 12. At 1706, the remote monitor 20 may determine whether a menu shift is possible to account for the equipment malfunction by moving menu items from the malfunctioning equipment to remaining available equipment. At 1708, when the menu shift is not possible, the remote monitor 20 proceeds to 1712. For example, the remote monitor 20 may determine that no other kitchen equipment 14 is available at the site 12 to prepare the menu items previously included on the menu for the malfunctioning equipment. At 1708, when a menu shift is possible, the remote monitor communicates an updated menu, with the determined menu shift, to the supervisory controller 10 at the particular site 12, with the updated menu include menu items to account for the equipment malfunction. The control algorithm 1700 ends at 1712.

The remote monitor 20 and/or the remote terminal 22 may include a dashboard for displaying menu information associated with kitchen equipment across multiple sites. In other words, a user at a remote terminal could view menu version information, for example, currently installed at kitchen equipment across multiple sites.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

For purposes of clarity, the same reference numbers are used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently), as appropriate, without altering the principles of the present disclosure.

As used herein, the term module may refer to, be part of, or include: an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first stage, element, component, region, layer or section discussed below could be termed a second stage, element, component, region, layer or section without departing from the teachings of the example embodiments.

What is claimed is:

1. A system comprising:
    an equipment controller for operating a piece of kitchen equipment, the equipment controller having a memory storing an initial menu with a plurality of food items and a plurality of associated operating parameters, each food item having at least one associated operating parameter from the plurality of associated operating parameters for operating the piece of kitchen equipment when preparing the associated food item;
    a supervisory controller in communication with the equipment controller and in communication with a remote monitor, the remote monitor being configured to receive an updated menu for the piece of kitchen equipment from a remote terminal, the updated menu including at least one of a food item modification to the plurality of food items of the initial menu and an operating parameter modification to at least one associated operating parameter of the plurality of associated operating parameters of the initial menu; and
    a user interface associated with the piece of kitchen equipment, the initial menu including an icon associated with each food item of the plurality of food items, the icon including a graphical depiction of the associated food item, the user interface being configured to display the icon associated with each food item of the plurality of food items and to receive a selection from the plurality of food items;
    wherein the supervisory controller is configured to receive the updated menu from the remote monitor and communicate the updated menu to the equipment controller and the equipment controller is configured to install the updated menu by at least one of updating the initial menu based on the updated menu and replacing the initial menu with the updated menu; and
    wherein the updated menu includes a user interface modification including at least one of a modification to an existing icon of the initial menu and an addition of a new icon.

2. The system of claim 1, wherein the user interface is located at the piece of kitchen equipment.

3. The system of claim 1, further comprising a user interface device, separate from the piece of kitchen equipment and in communication with the piece of kitchen equipment, that includes the user interface.

4. The system of claim 1, wherein the supervisory controller is also in communication with at least one of: an HVAC system; a refrigeration system; a lighting system; an electrical system; a fire alarm and sprinkler system; and a security system.

5. The system of claim 1, wherein the equipment controller is configured to communicate a message to the supervisory controller indicating successful installation when the installation by the equipment controller is successful and indicating unsuccessful installation when the installation by the equipment controller is not successful, and wherein the supervisory controller is configured to communicate the message to the remote monitor.

6. The system of claim 1, wherein the equipment controller includes initial firmware for operation of the piece of kitchen equipment, and the supervisory controller is configured to receive updated firmware for the piece of kitchen equipment from the remote monitor and communicate the updated firmware to the equipment controller for installation by the equipment controller.

7. The system of claim 1, wherein the at least one associated operating parameter includes at least one of a cook time and a cook temperature used during operation of the piece of kitchen equipment when preparing the associated food item, wherein the updated menu includes the operating parameter modification and the operating parameter modification includes a modification of at least one of the cook time and the cook temperature.

8. The system of claim 1, wherein the updated menu includes the food item modification and the food item modification includes at least one of a modification to an existing food item from the plurality of food items, an addition to the plurality of food items, and a deletion from the plurality of food items.

9. The system of claim 1, wherein the supervisory controller is configured to receive usage data associated with the piece of kitchen equipment from the equipment controller and communicate the usage data to the remote monitor, and wherein the remote monitor is configured to determine whether maintenance is needed for the piece of kitchen equipment based on the usage data and generate a maintenance notification when maintenance is needed for the piece of kitchen equipment.

10. The system of claim 1, further comprising an additional equipment controller for operating an additional piece of kitchen equipment, the supervisory controller being in communication with the additional equipment controller, wherein the supervisory controller is configured to receive first usage data associated with the piece of kitchen equipment and second usage data associated with the additional piece of kitchen equipment, and communicate the first usage data and the second usage data to the remote monitor, and wherein the remote monitor is configured to compare the first usage data with the second usage data and generate a notification indicating uneven use of the piece of kitchen equipment and the additional piece of kitchen equipment based on the comparison.

11. The system of claim 1, wherein the supervisory controller is configured to receive energy data for the piece of kitchen equipment and communicate the energy data to the remote monitor and wherein the remote monitor is configured to generate at least one of an energy report and an energy recommendation based on the received energy data.

12. The system of claim 11, wherein the remote monitor is configured to receive energy data for kitchen equipment at a plurality of sites, compare the received energy data from the plurality of sites, and generate at least one of an energy report and an energy recommendation based on the comparison.

13. The system of claim 1 wherein the supervisory controller is configured to receive at least one of closing time data, alarm data, and occupancy data for a site associated with the piece of kitchen equipment, determine whether the site is occupied based on at least one of the closing time data, the alarm data, and the occupancy data for the site, determine whether the piece of kitchen equipment is on, and generate an alarm when the site is not occupied and the piece of kitchen equipment is on.

14. The system of claim 1 wherein the remote monitor is configured to determine whether the updated menu is compatible with the piece of kitchen equipment and generate a notification when the updated menu is not compatible with the piece of kitchen equipment.

15. The system of claim 1 wherein the remote monitor is configured to receive menu modification data from each of a plurality of supervisory controllers, the menu modification data indicating a modification to an operating parameter for an associated piece of kitchen equipment, and wherein the remote monitor is configured to determine a menu modification trend based on the menu modification data and generate a notification based on the menu modification trend.

16. The system of claim 1 wherein the supervisory controller is configured to compare menu modification data for a plurality of pieces of kitchen equipment, the menu modification data indicating a modification to an operating parameter for an associated piece of kitchen equipment, and wherein the supervisory controller is configured to determine a menu modification trend based on the menu modification data and generate a notification based on the menu modification trend.

17. The system of claim 1 wherein the remote monitor is configured to receive menu modification data from each of a plurality of supervisory controllers, the menu modification data indicating a modification to an operating parameter for an associated piece of kitchen equipment, and receive revenue data associated with each site associated with the plurality of supervisory controllers, wherein the remote monitor is configured to determine a correlation between a particular menu modification and revenue based on the menu modification data and the revenue data and generate a notification based on the correlation.

18. The system of claim 1 further comprising an additional equipment controller for operating an additional piece of kitchen equipment, the additional equipment controller storing an additional menu, wherein the supervisory controller is configured to determine that the additional piece of kitchen equipment is malfunctioning, and send a notification of the malfunction to the remote monitor, wherein the remote monitor is configured to receive the notification of the malfunction, generate a shifted menu for the piece of kitchen equipment based on the initial menu and the additional menu, and communicate the shifted menu to the supervisory controller for communication to the equipment controller.

19. The system of claim 1, wherein the remote terminal includes a display that displays information associated with a plurality of menus associated with a plurality of kitchen equipment at a plurality of sites.

20. A method comprising:
storing, with an equipment controller for operating a piece of kitchen equipment, an initial menu in a memory of the equipment controller, the initial menu having a plurality of food items and a plurality of associated operating parameters, each food item having at least one associated operating parameter from the plurality of associated operating parameters for operating the piece of kitchen equipment when preparing the associated food item, and the initial menu including an icon associated with each food item of the plurality of food items, the icon including a graphical depiction of the associated food item;
displaying, with a user interface associated with the piece of kitchen equipment, the icon associated with each food item of the plurality of food items, the user interface being configured to receive a selection from the plurality of food items;
receiving, with a supervisory controller in communication with the equipment controller and in communication with a remote monitor, an updated menu for the piece of kitchen equipment from a remote terminal, the updated menu being first received by the remote monitor from a remote terminal and then communicated from the remote monitor to the supervisory controller, the updated menu including at least one of a food item modification to the plurality of food items of the initial menu and an operating parameter modification to at least one associated operating parameter of the plurality of associated operating parameters of the initial menu;
communicating, with the supervisory controller, the updated menu to the equipment controller; and
installing, with the equipment controller, the updated menu by at least one of updating the initial menu based on the updated menu and replacing the initial menu with the updated menu;
wherein the updated menu includes a user interface modification including at least one of a modification to an existing icon of the initial menu and an addition of a new icon.

21. The method of claim 20, wherein the user interface is located at the piece of kitchen equipment.

22. The method of claim 20, wherein the user interface is provided by a user interface device, separate from the piece of kitchen equipment and in communication with the piece of kitchen equipment.

23. The method of claim 20, wherein the supervisory controller is also in communication with at least one of: an HVAC system; a refrigeration system; a lighting system; an electrical system; a fire alarm and sprinkler system; and a security system.

24. The method of claim 20, further comprising:
communicating, with the equipment controller, a message to the supervisory controller indicating successful installation when the installation by the equipment controller is successful and indicating unsuccessful installation when the installation by the equipment controller is not successful; and
communicating, with the supervisory controller, the message to the remote monitor.

25. The method of claim 20, wherein the equipment controller includes initial firmware for operation of the piece of kitchen equipment, the method further comprising:
receiving, with the supervisory controller, updated firmware for the piece of kitchen equipment from remote monitor; and
communicating, with the supervisory controller, the updated firmware to the equipment controller for installation by the equipment controller.

26. The method of claim 20, wherein the at least one associated operating parameter includes at least one of a cook time and a cook temperature used during operation of the piece of kitchen equipment when preparing the associated food item, wherein the updated menu includes the operating parameter modification and the operating parameter modification includes a modification of at least one of the cook time and the cook temperature.

27. The method of claim 20, wherein the updated menu includes the food item modification and the food item modification includes at least one of a modification to an existing food item from the plurality of food items, an addition to the plurality of food items, and a deletion from the plurality of food items.

28. The method of claim 20, further comprising:
receiving, with the supervisory controller, usage data associated with the piece of kitchen equipment from the equipment controller;
communicating, with the supervisory controller, the usage data to the remote monitor;
determining, with the remote monitor, whether maintenance is needed for the piece of kitchen equipment based on the usage data; and
generating, with the remote monitor, a maintenance notification when it is determined that maintenance is needed for the piece of kitchen equipment.

29. The method of claim 20, further comprising:
communicating, with the supervisory controller, with an additional equipment controller for operating an additional piece of kitchen equipment;
receiving, with the supervisory controller, first usage data associated with the piece of kitchen equipment and second usage data associated with the additional piece of kitchen equipment;
communicating, with the supervisory controller, the first usage data and the second usage data to the remote monitor;
comparing, with the remote monitor, the first usage data with the second usage data; and generating, with the remote monitor, a notification indicating uneven use of the piece of kitchen equipment and the additional piece of kitchen equipment based on the comparison.

30. The method of claim 20, further comprising:
receiving, with the supervisory controller, energy data for the piece of kitchen equipment;
communicating, with the supervisory controller, the energy data to the remote monitor; and
generating, with the remote monitor, at least one of an energy report and an energy recommendation based on the received energy data.

31. The method of claim 30, further comprising:
receiving, with the remote monitor, energy data for kitchen equipment at a plurality of sites;
comparing, with the remote monitor, the received energy data from the plurality of sites; and
generating, with the remote monitor, at least one of an energy report and an energy recommendation based on the comparison.

32. The method of claim 20, further comprising:
receiving, with the supervisory controller, at least one of closing time data, alarm data, and occupancy data for a site associated with the piece of kitchen equipment;
determining, with the supervisory controller, whether the site is occupied based on at least one of the closing time data, the alarm data, and the occupancy data for the site, determines whether the piece of kitchen equipment is on; and
generating, with the supervisory controller, an alarm when the site is not occupied and the piece of kitchen equipment is on.

33. The method of claim 20, further comprising:
determining, with the remote monitor, whether the updated menu is compatible with the piece of kitchen equipment; and
generating, with the remote monitor, a notification when the updated menu is not compatible with the piece of kitchen equipment.

34. The method of claim 20, further comprising:
receiving, with the remote monitor, menu modification data from each of a plurality of supervisory controllers, the menu modification data indicating a modification to an operating parameter for an associated piece of kitchen equipment;
determining, with the remote monitor, a menu modification trend based on the menu modification data; and
generating, with the remote monitor, a notification based on the menu modification trend.

35. The method of claim 20, further comprising:
receiving, with the supervisory controller, menu modification data from a plurality of pieces of kitchen equipment, the menu modification data indicating a modification to an operating parameter for an associated piece of kitchen equipment;
determining, with the supervisory controller, a menu modification trend based on the menu modification data; and
generating, with the supervisory controller, a notification based on the menu modification trend.

36. The method of claim 20, further comprising:
receiving, with the remote monitor, menu modification data from each of a plurality of supervisory controllers, the menu modification data indicating a modification to an operating parameter for an associated piece of kitchen equipment;

receiving, with the remote monitor, revenue data associated with each site associated with the plurality of supervisory controllers;

determining, with the remote monitor, a correlation between a particular menu modification and revenue based on the menu modification data and the revenue data; and generating, with the remote monitor, a notification based on the correlation.

37. The method of claim 20, further comprising:

storing, with an additional equipment controller for operating an additional piece of kitchen equipment, an additional menu;

determining, with the supervisory controller, that the additional piece of kitchen equipment is malfunctioning;

sending, with the supervisory controller, a notification of the malfunction to the remote monitor;

receiving, with the remote monitor, the notification of the malfunction; and generating, with the remote monitor, a shifted menu for the piece of kitchen equipment based on the initial menu and the additional menu; and communicating, with the remote monitor, the shifted menu to the supervisory controller for communication to the equipment controller.

38. The method of claim 20, further comprising displaying, with a display of the remote terminal, information associated with a plurality of menus associated with a plurality of kitchen equipment at a plurality of sites.

39. A system comprising:

an equipment controller for operating a piece of kitchen equipment, the equipment controller having a memory storing an initial menu with a plurality of food items and a plurality of associated operating parameters, each food item having at least one associated operating parameter from the plurality of associated operating parameters for operating the piece of kitchen equipment when preparing the associated food item; and a supervisory controller in communication with the equipment controller and in communication with a remote monitor, the remote monitor being configured to receive an updated menu for the piece of kitchen equipment from a remote terminal, the updated menu including at least one of a food item modification to the plurality of food items of the initial menu and an operating parameter modification to at least one associated operating parameter of the plurality of associated operating parameters of the initial menu;

an additional equipment controller for operating an additional piece of kitchen equipment, the additional equipment controller storing an additional menu;

wherein the supervisory controller is configured to receive the updated menu from the remote monitor and communicate the updated menu to the equipment controller, and the equipment controller is configured to install the updated menu by at least one of updating the initial menu based on the updated menu and replacing the initial menu with the updated menu;

wherein the supervisory controller is further configured to determine that the additional piece of kitchen equipment is malfunctioning and send a notification of the malfunction to the remote monitor; and wherein the remote monitor is further configured to receive the notification of the malfunction, generate a shifted menu for the piece of kitchen equipment based on the initial menu and the additional menu, and communicate the shifted menu to the supervisory controller for communication to the equipment controller.

* * * * *